Aug. 11, 1942.                W. R. GRISWOLD                2,292,633
                                 MOTOR VEHICLE
                              Filed Aug. 16, 1940              8 Sheets-Sheet 3
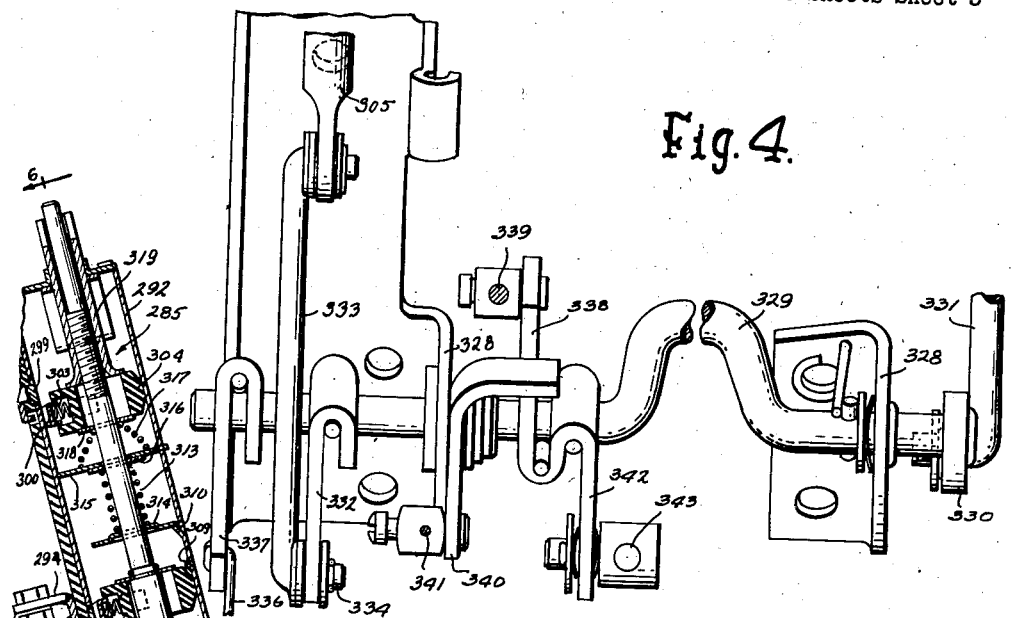
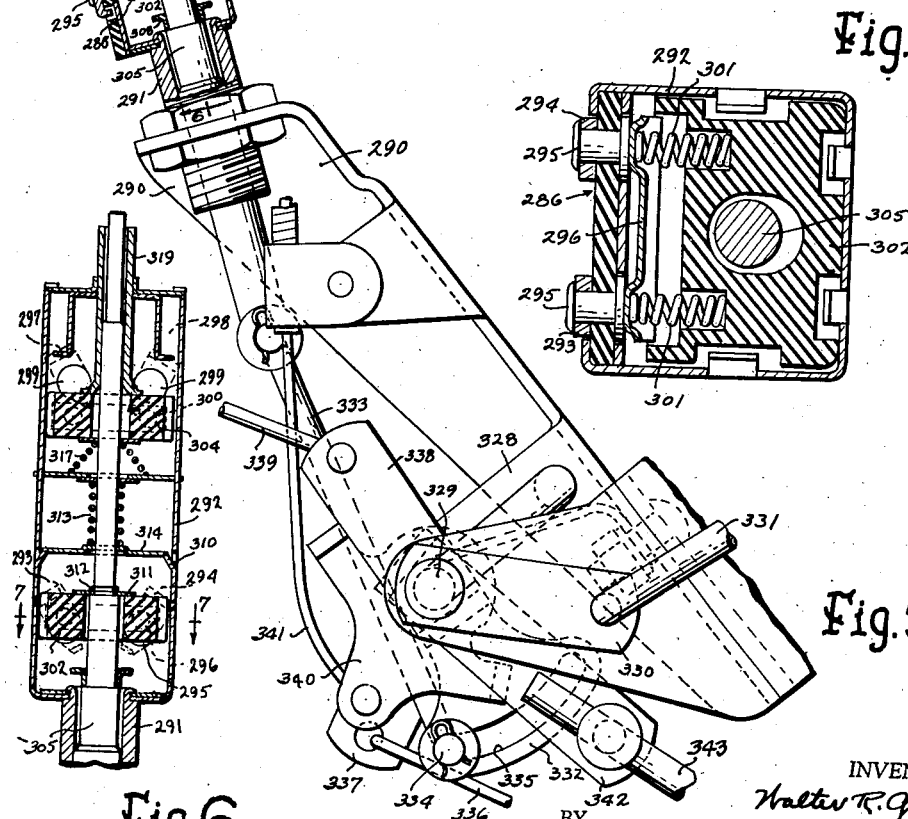
INVENTOR.
Walter R. Griswold
Tibbetts & Hart
   BY      attorneys Aug. 11, 1942. W. R. GRISWOLD 2,292,633
MOTOR VEHICLE
Filed Aug. 16, 1940 8 Sheets-Sheet 4
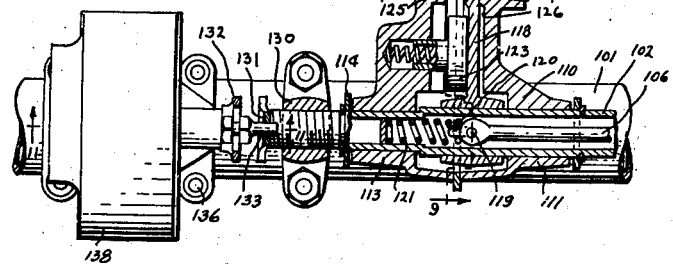
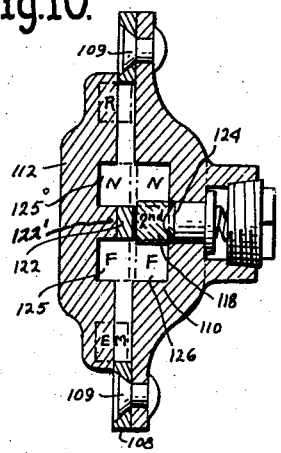
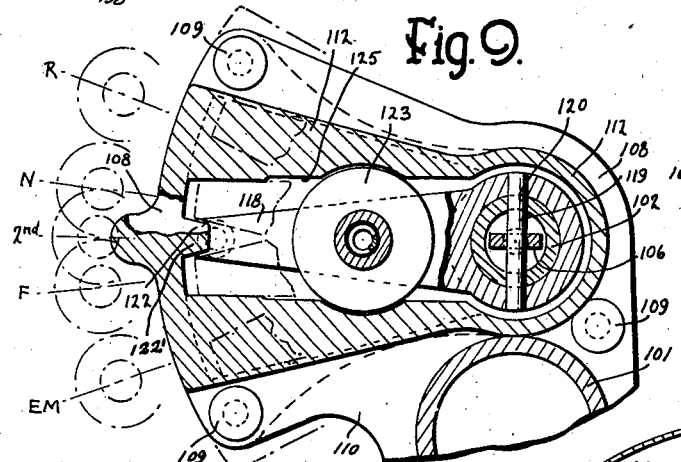
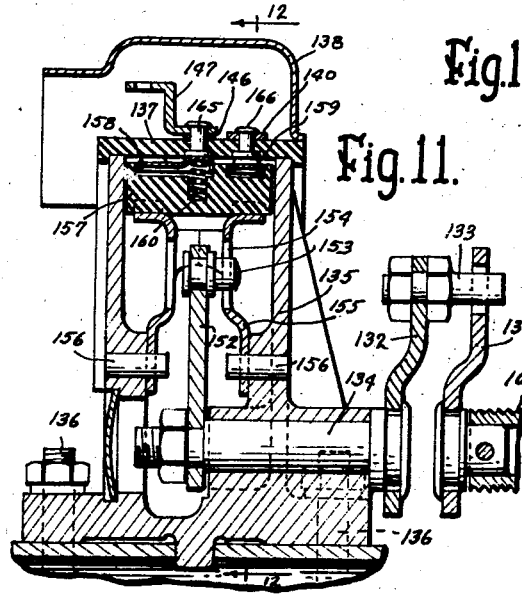
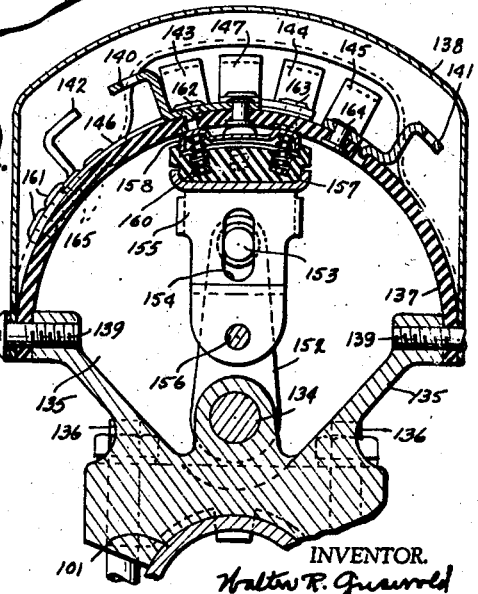
INVENTOR.
Walter R. Griswold
BY
Tibbetts & Hart
Attorneys

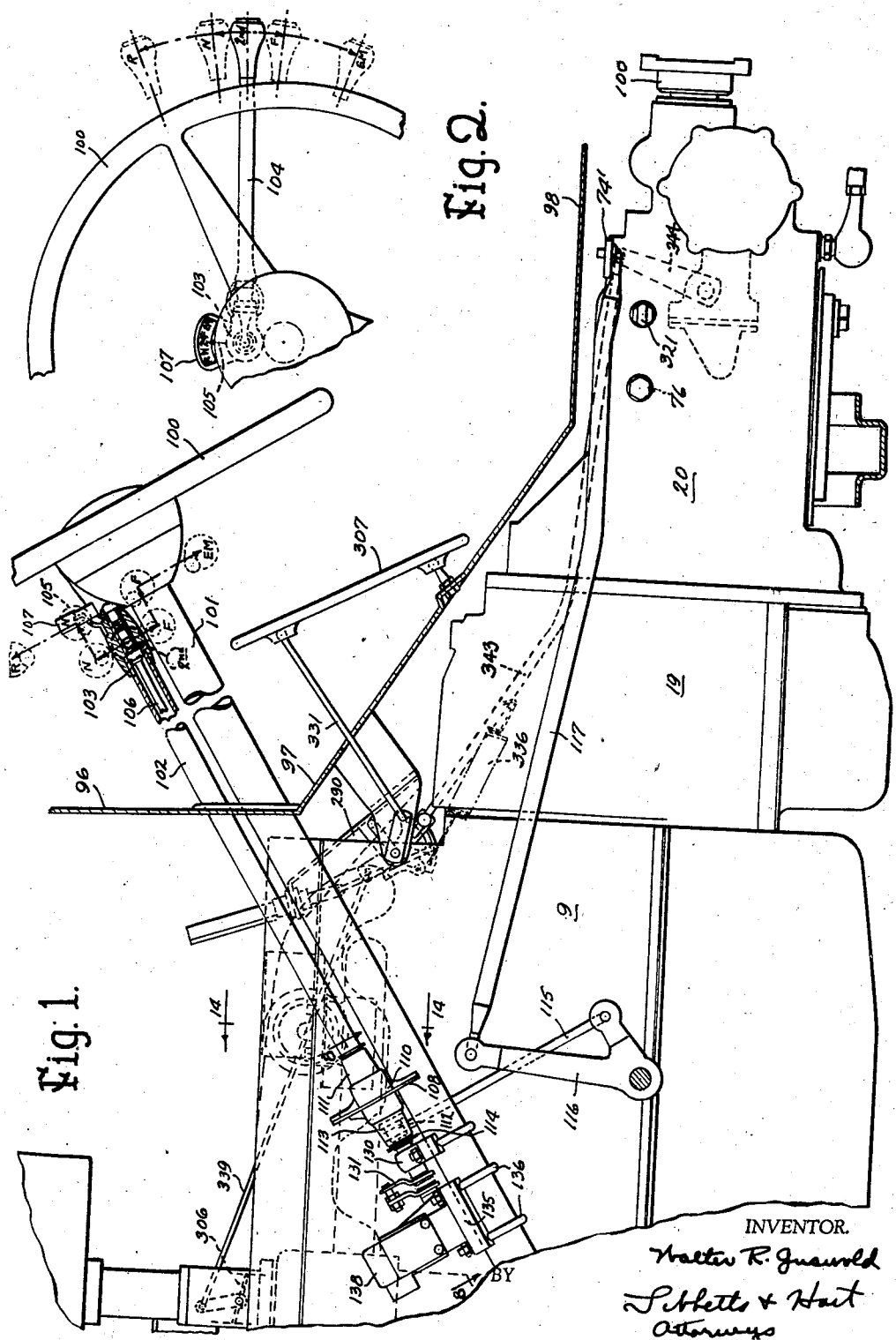

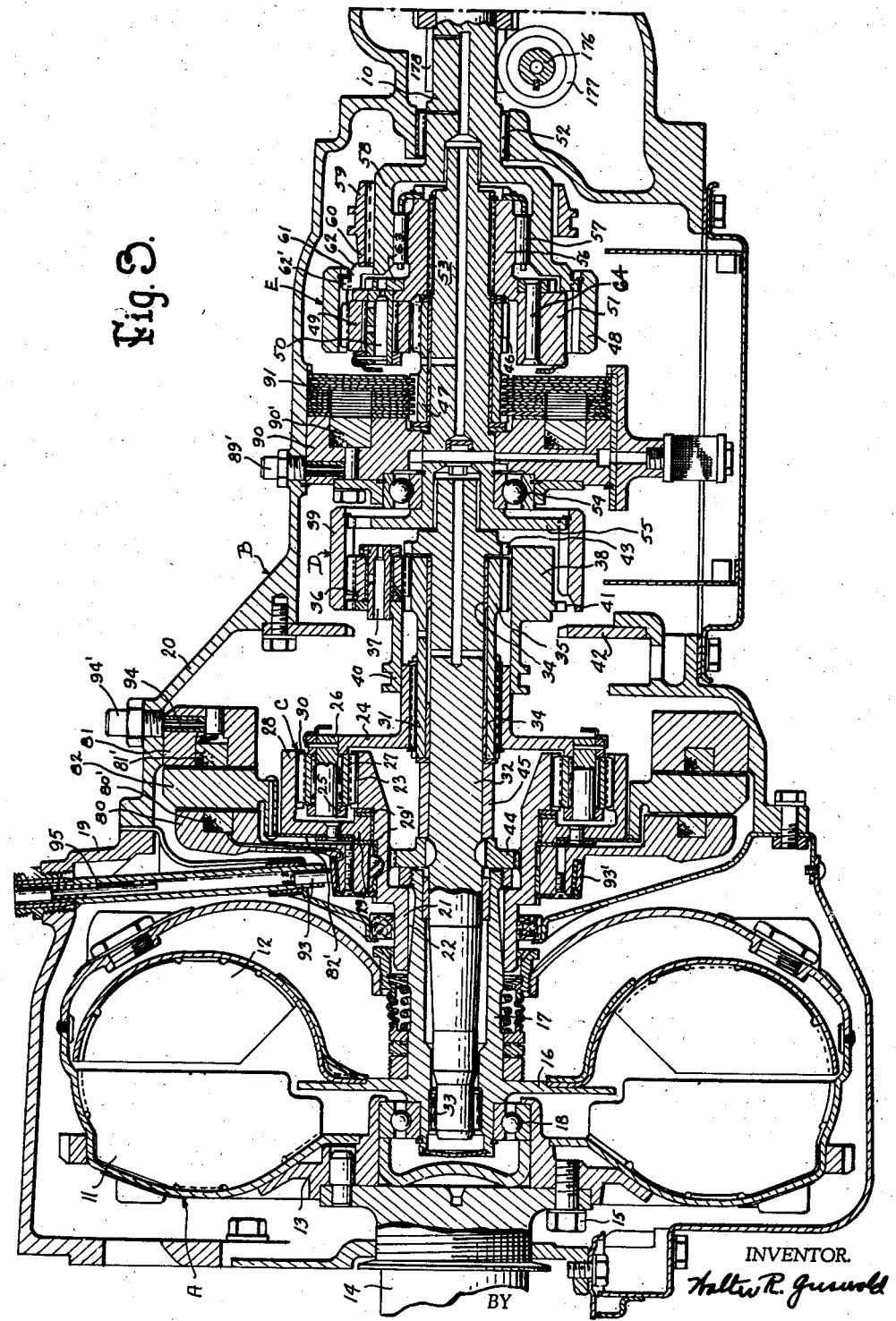

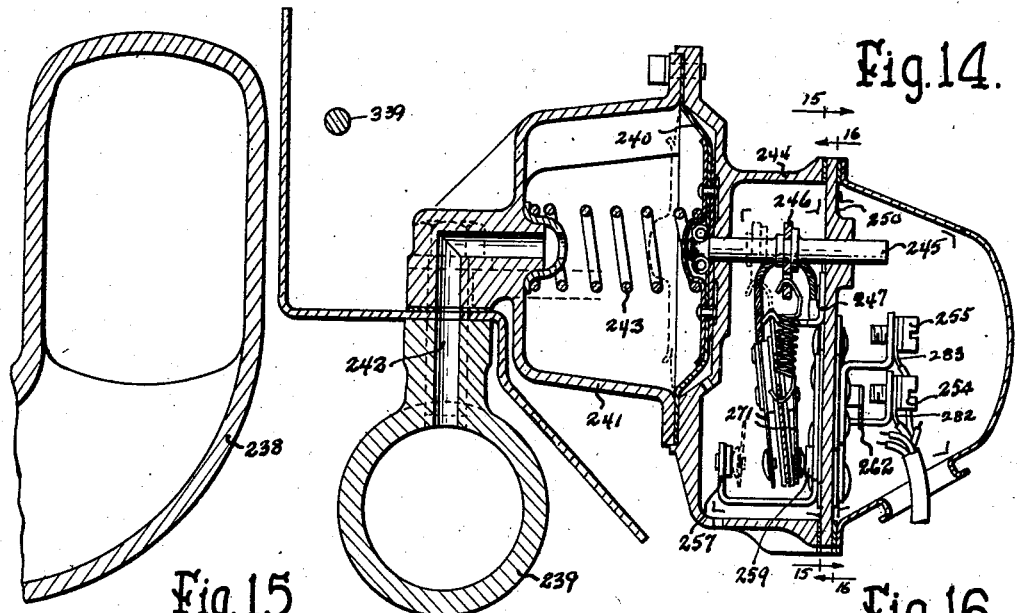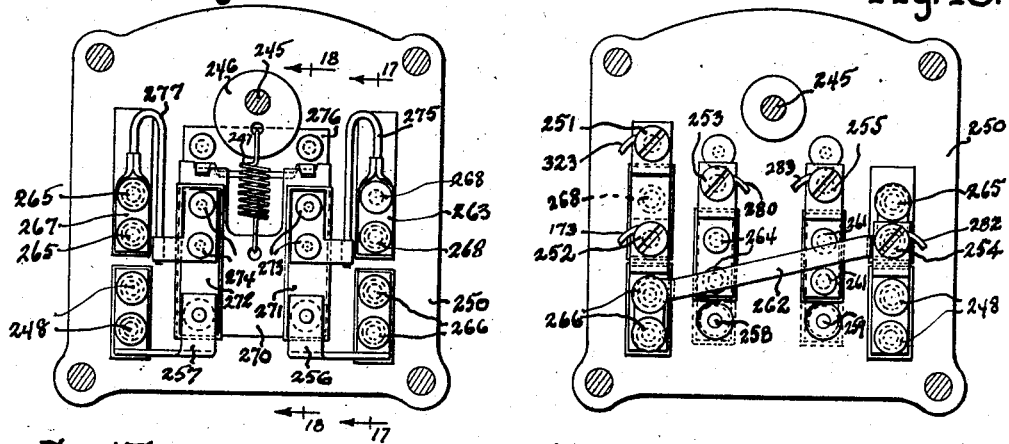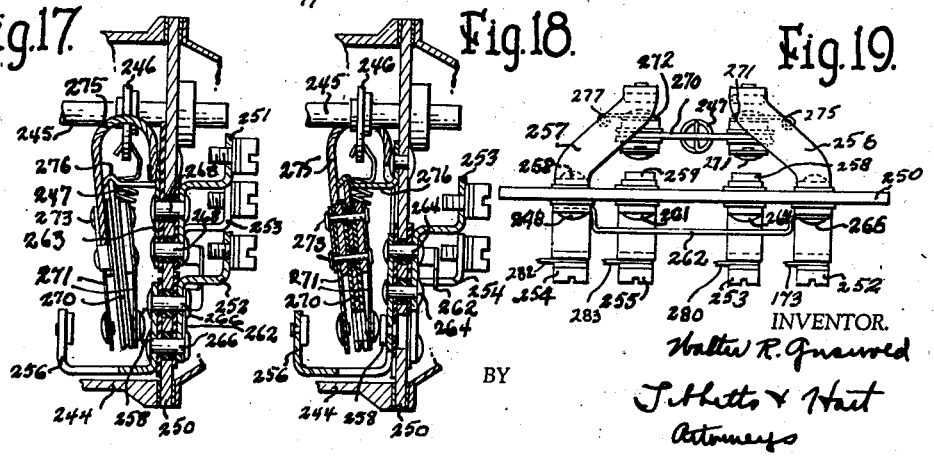

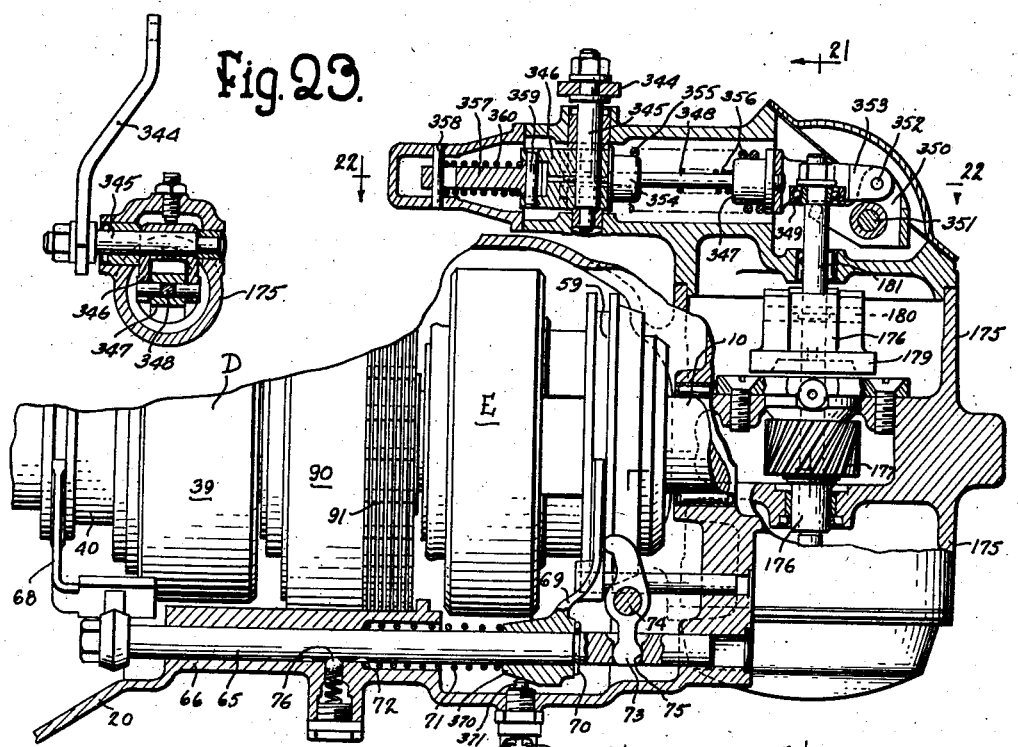
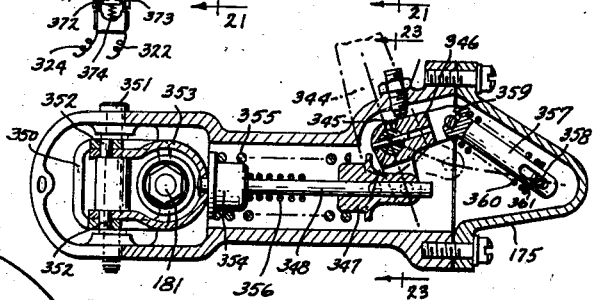
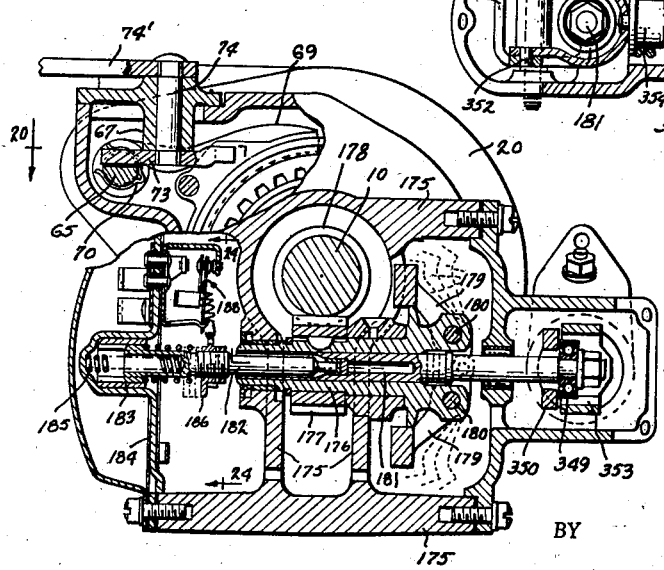

Aug. 11, 1942.   W. R. GRISWOLD   2,292,633
MOTOR VEHICLE
Filed Aug. 16, 1940   8 Sheets-Sheet 7
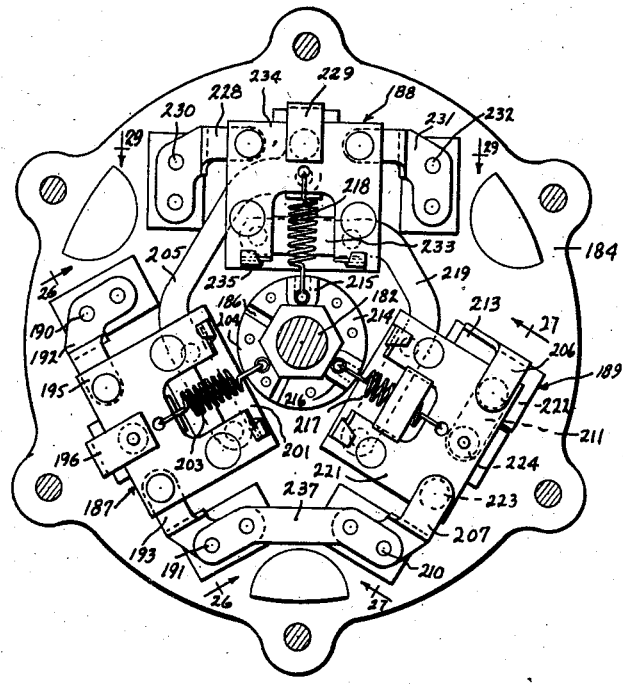
Fig. 24.
Fig. 25.
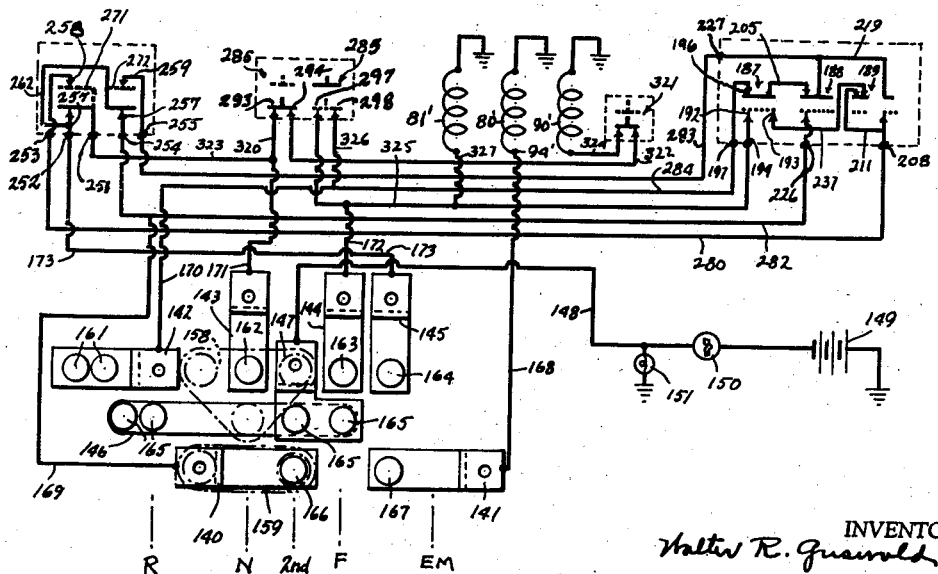
INVENTOR.
Walter R. Griswold
BY
Sibbett & Hart
attorneys

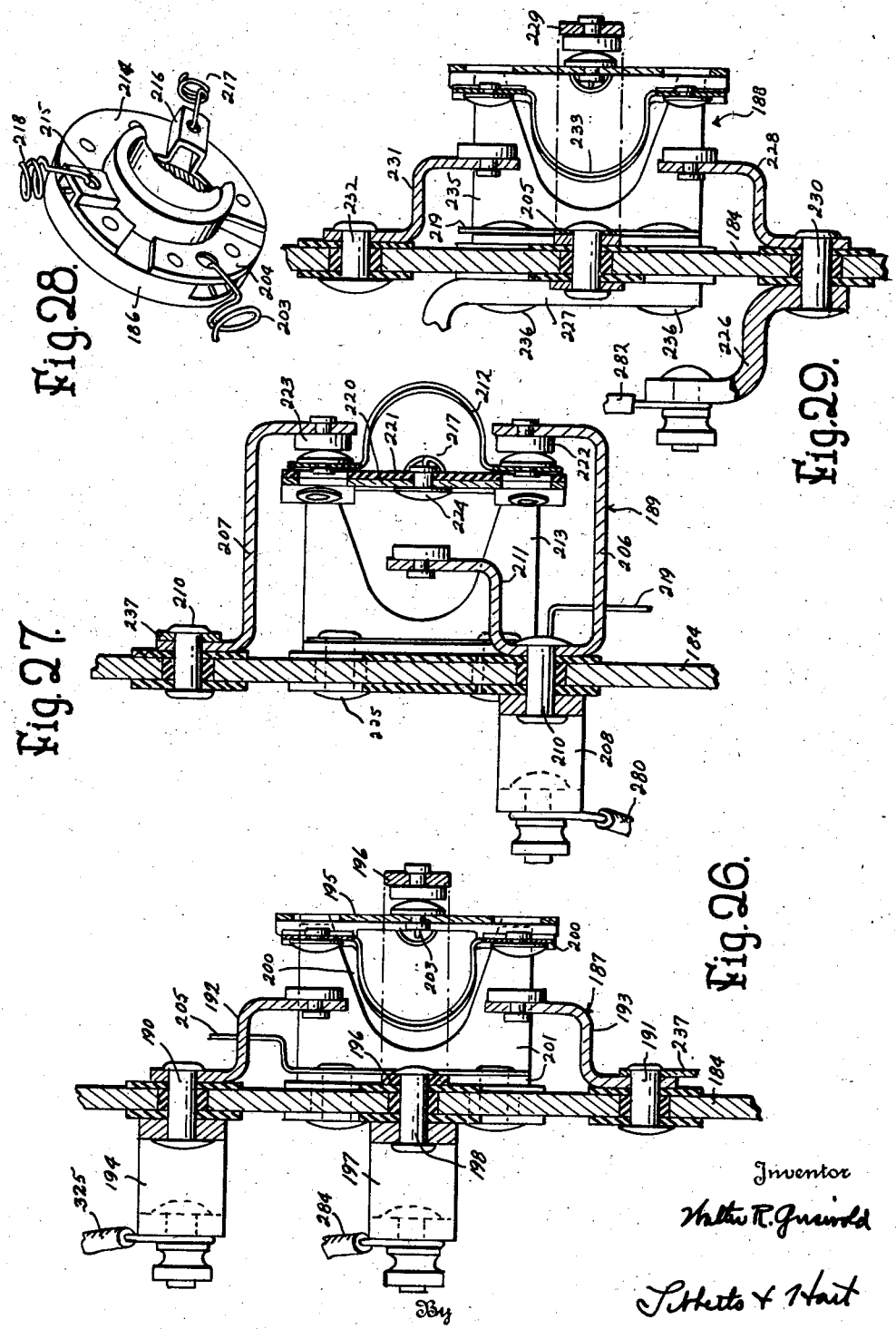

Patented Aug. 11, 1942

2,292,633

UNITED STATES PATENT OFFICE 2,292,633

MOTOR VEHICLE

Walter R. Griswold, Detroit, Mich., assignor to Packard Motor Car Company, Detroit, Mich., a corporation of Michigan Application August 16, 1940, Serial No. 352,878

41 Claims. (Cl. 74—472)

This invention relates to power transmitting mechanism and more particularly to such mechanism for use in driving motor vehicles.

Various types of automatic or semi-automatic power transmitting mechanisms have been proposed for driving motor vehicles, and a few of such devices have been used to a limited extent. They have not been generally accepted because of difficulties or disadvantages encountered due mainly to cost, size or control.

In one type of such mechanisms, two planetary gearing units are employed and each unit is controlled by a relatively large diameter armature disk operating between two magnetic clutches, the same being operable to provide four forward driving speeds. The trend of motor vehicle design is to reduce the height of the body floor above the ground, and in order to accommodate the rear pair of clutches of such mechanisms having an adequate driving capacity it is now necessary to provide a housing or tunnel therefor that projects considerably above the floor of the body and into the passenger space. No difficulty is encountered in accommodating the front pair of clutches of such mechanism as they can be located in the space beneath or in advance of the toe board. Such magnetic clutches present a rotating mass providing acceleration forces that have to be dealt with and they also have a definite drag, and because of this drag it has been necessary to provide for an undesirable timing delay when shifting from one to the other of the clutches in each pair.

Automatic operation of a power transmitting mechanism must necessarily contemplate providing a selection of gear ratios which will give maximum acceleration for all car speeds at wide open throttle position, and should likewise provide automatic adjustment to the lowest numerical transmission gear ratio that will be suitable for road load conditions when the car is running at substantially uniform speed, and further to fulfill the conditions of good automatic operation, all intermediate requirements between road load requirements and wide open throttle requirements must be provided for.

It is an object of this invention to provide such a control for a motor vehicle power transmitting mechanism of the type referred to by the provision therewith of a fluid coupling and a driving speed governing means under the control of the driver of the vehicle through manipulation of the throttle control mechanism.

Another object of the invention is to provide an arrangement of gearing, controls and associated parts that can be easily fitted to a motor vehicle without the use of an objectionable housing projecting above the floor of the body into the passenger compartment.

Still another object of the invention is to provide power transmitting mechanism of the type referred to in which helical gears can be employed so that quiet operation will be had.

Another object of the invention is to provide an automatic transmission of the magnetic type in which one planetary gearing is controlled to provide either one of two speeds, with another planetary gearing and an overrunning clutch that can be operated to modify or directly continue the selected drive so that drag shift delay and acceleration forces heretofore found in a similar magnetic control of a planetary gearing are eliminated.

Another object of the invention is to provide a power transmitting mechanism having two planetary gearing units, the forward one of which drives direct or reduces the drive and the rear one of which provides an overdrive thereby reducing the drive capacity of the rear planetary control to a minimum.

Another object of the invention is to provide an automatic power transmitting mechanism of the type referred to that will respond to the driver's desire simply by actuation of the accelerator pedal in order to produce the best operating conditions for the vehicle.

Still another object of the invention is to provide a magnetic control for planetary gearing in a power transmitting system for motor vehicles in which the electric system is broken through release of the accelerator pedal when the vehicle is standing still.

Another object of the invention is to provide control mechanism for a power transmitting gearing in which a manual shift is employed to prepare for neutral, forward and reverse drives, and in which a plurality of forward gear ratios will be automatically obtained.

Another object of the invention is to provide a positive mechanical connection through a power transmitting mechanism of the automatic shifting type controlled by an electrical system so that the vehicle can be pushed or driven when the electric system is for any reason inoperative.

Still another object of the invention is to provide an automatic power transmitting mechanism of the type referred to in which the control can be established manually to provide one of the forward drives.

Another object of the invention is to provide means in the control of a magnetic control for a power transmitting mechanism of the planetary type in which the drive can be shifted back and forth between direct and overdrive in response to manipulation of the accelerator pedal.

Another object of the invention is to provide an automatic power transmitting mechanism of the type referred to in which the control mechanism includes a governor, the effectiveness of which is varied in accordance with throttle conditions.

Another object of the invention is to provide control mechanism for automatic power transmitting mechanism of the type referred to that includes a governor, the effectiveness of which is controlled by pressure conditions in the engine manifold of the vehicle being driven so that free wheeling is eliminated except below an extremely low speed.

Other objects of the invention will appear from the following description taken in connection with the drawings, which form a part of this specification, and in which:

Fig. 1 is a fragmentary side elevational view of a motor vehicle having the invention incorporated therewith;

Fig. 2 is a fragmentary plan view of the steering wheel having the hand control and indicator of the power transmitting mechanism associated therewith;

Fig. 3 is a vertical sectional view taken longitudinally through the power transmitting mechanism;

Fig. 4 is a front elevational view of actuating mechanism under the control of the throttle mechanism by means of which the electrical control system is regulated;

Fig. 5 is a side elevational view of the mechanism shown in Fig. 4, and includes in section the switch device directly actuated by the accelerator pedal;

Fig. 6 is a sectional view of the accelerator pedal operated switch device taken on line 6—6 of Fig. 5;

Fig. 7 is another sectional view of the accelerator pedal operated switch device taken on line 7—7 of Fig. 6;

Fig. 8 is a sectional view of the manually controlled switch and shift rod mechanism taken on line 8—8 of Fig. 1;

Fig. 9 is a sectional view of the rod shifting mechanism taken on line 9—9 of Fig. 8;

Fig. 10 is another sectional view of the rod shifting mechanism taken on line 10—10 of Fig. 8;

Fig. 11 is a sectional view of the manually controlled switch taken on line 11—11 of Fig. 8;

Fig. 12 is another sectional view of the manually controlled switch taken on line 12—12 of Fig. 11;

Fig. 13 is a fragmentary plan view of the switch device shown in Figs. 11 and 12;

Fig. 14 is a sectional view taken on line 14—14 of Fig. 1, showing another part of the control for the transmission and more particularly the vacuum controlled switch mechanism;

Fig. 15 is a sectional view of the vacuum switch device taken on line 15—15 of Fig. 14;

Fig. 16 is another sectional view of the vacuum switch device taken on line 16—16 of Fig. 14;

Fig. 17 is a sectional view of the vacuum switch mechanism taken on line 17—17 of Fig. 15;

Fig. 18 is another sectional view of the vacuum switch mechanism taken on line 18—18 of Fig. 15;

Fig. 19 is a bottom plan view of the vacuum switch mechanism shown in Figs. 15 and 16;

Fig. 20 is a plan view of the transmission mechanism with the casing partly broken away showing the manual change speed shift mechanisms and a portion of the governor control mechanism taken approximately on line 20—20 of Fig. 21;

Fig. 21 is a sectional view of the governor control mechanism taken on line 21—21 of Fig. 20;

Fig. 22 is a sectional view of the governor modifying mechanism taken on line 22—22 of Fig. 20;

Fig. 23 is a sectional view of the governor modifying mechanism taken on line 23—23 of Fig. 22;

Fig. 24 is a sectional view of the governor controlled switch taken on line 24—24 of Fig. 21;

Fig. 25 is a diagrammatic illustration of the electrical control system;

Fig. 26 is a sectional view of the governor controlled switch mechanism taken on line 26—26 of Fig. 24;

Fig. 27 is a sectional view of the governor controlled switch mechanism taken on line 27—27 of Fig. 24;

Fig. 28 is a perspective view of the governor switch actuator hub removed from the governor shaft;

Fig. 29 is a sectional view of the governor controlled switch mechanism taken on line 29—29 of Fig. 24.

The power transmitting mechanism shown in the drawings can be utilized as a drive for various purposes, such as for motor vehicles. Such mechanism comprises generally a fluid coupling A, driven by engine 9, and change speed gearing B. The drive passes from the change speed gearing through tail shaft 10, which may extend rearwardly of the vehicle to drive the usual vehicle traction wheels (not shown).

The fluid coupling A may be of any suitable construction for transmitting drive between the prime mover and the change speed mechanism B and, as illustrated, comprises conventional driving vane member 11 and driven vane member 12. The driving vane member 11 is carried by hub 13 fixed on the engine crankshaft 14 by bolts 15 and the driven vane member 12 is fixed to hub 16 forming part of a sleeve shaft 17. The forward end of shaft 17 projects into hub 13 and a suitable bearing 18 is arranged therebetween.

As best shown in Fig. 3, the transmission casing is comprised of two main sections, the forward section 19 enclosing the fluid coupling A and the rear section 20 enclosing the change speed mechanism B. The change speed mechanism includes three aligned planetary gearings C, D, and E.

In the forward planetary gearing C there is a sleeve 21 splined at 22 to shaft 17 and having a helical toothed sun gear 23 formed on its rear end. A carrier 24 and ring 25 support shafts 26 on which helical toothed planet gears 27 are rotatably mounted and these planet gears mesh with the sun gear and with helical teeth of ring gear 28. The ring gear has a hub portion 29, rotatably mounted on the sun gear sleeve, and peripheral teeth 30, suitable thrust washers 29' being arranged at each end of the hub portion. Carrier 24 is splined on a sleeve shaft 31 that aligns with sleeve shaft 17, and through such sleeve shafts extends a shaft 32. Suitable bearings 33 and 34 are arranged between shaft 32 and sleeve shafts 17 and 31.

On the rear end of sleeve shaft 31 is formed the sun gear 35 of planetary gearing D. Planet gears 36 mesh with this sun gear and are carried on shafts 37 supported on carrier 38. A ring gear 39 meshes with these planet gears. This planetary gearing provides a coupling between the front and rear planetary gearing C and E. The carrier 38 is formed with a sleeve 40 having a collar arranged to be engaged by shifting mechanism. Teeth 41 are formed on the carrier and they can be shifted to engage with the internal teeth of ring gear 39 or forwardly to engage teeth formed on a plate 42 fixed to the casing 20. When the carrier teeth are shifted to engage the plate teeth the carrier is of course held stationary and the pinions 36 will rotate to provide a reverse drive from the sun gear to the ring gear. When the carrier is free from the holding plate and the pinion gears mesh only with the sun gear and ring gear then the drive through planetary gearing D will be direct forward.

Direct positive drive between planetary gearing E and the fluid coupling can be established through shaft 32. On the shaft are formed clutch teeth 43, and the carrier is shiftable rearwardly to mesh the planet gears 36 with teeth 43 while they remain in mesh with the sun and ring gears. Shaft 32 is positively coupled to the sun gear sleeve 21 by ring member 44 and between such ring member and sleeve shaft 31 is a spacer ring 45. When the planet gears 36 mesh with teeth 43, the ring gear 39 will be positively connected to shaft 17 through shaft 32, member 44, sleeve 21 and the splined connection 22.

The rear planetary gearing E includes a helical toothed sun gear 46 formed on sleeve 47, helical toothed ring gear 48 and helical toothed planet gears 49. The planet gears are mounted on shafts 50 supported by the carrier 51, the carrier being splined on a shaft 53 extending through the sun gear sleeve and bearing 54. The forward end 55 of shaft 53 is formed with teeth that mesh with the teeth of ring gear 39 and provides a positive driving coupling between such ring gear and the rear planetary gearing. The tail shaft 10 has an enlarged hollow forward end 58 that is mounted in bearing 52 and telescopes an extended cam hub portion 56 of carrier 51. Between such carrier cam hub portion and the tail shaft is arranged overrunning rollers 57. Such rollers and hub provide a one-way drive between shafts 53 and 10 when the rear planetary gearing is free.

A two-way drive is provided by clutch means locking the carrier 51 of planetary gearing E so that the tail shaft will be positively coupled with shaft 53. Clutch ring 59 is slidably splined on the enlarged forward end 58 of the tail shaft and has forwardly extending fingers 60 arranged to extend through windows 61 in the radial flange 62 at the forward end of the tail shaft, the radial flange having teeth 62' in mesh with the teeth of ring gear 48. These fingers are formed with teeth that can be engaged with teeth on a ring 63 fixed to carrier 51 by rivets 64. Engagement of the clutch ring teeth with the teeth on ring 63 will positively couple the tail shaft and the carrier 51 so that there is a positive two-way drive connection between shafts 53 and 10.

When the planetary carrier sleeve 40 is shifted forward and engaged with the holding plate 42 to establish reverse drive, it is necessary that the two-way clutch ring 59 be coupled with the carrier ring 63 in order that there will be positive drive to the tail shaft, and this positive coupling is also desirable when planet gears 36 are engaged with teeth 43 of shaft 32 in order to provide a positive emergency drive coupling between the engine and the tail shaft. The last mentioned positive drive coupling is used when the vehicle must be pushed to start the engine or when the electric control mechanisms for the front and rear planetary gearings fail.

As the two-way coupling of ring 59 and ring 63 is made with the foremost or rearmost shift of the carrier 38, interconnected mechanism, see Figs. 20 and 21, is provided to obtain such results through the operation of a single manually controlled actuator. A rod 65 is mounted for axial movement in bearing 66 formed in a wall of casing 20. On one end of the rod is fixed a shift fork 68 that engages a collar or carrier sleeve 40 and slidably mounted on the rod is a shift fork 69 that operatively engages clutch ring 59. On the rod is fixed an abutment ring 70 that limits the axial movement of the fork 69 rearwardly on the rod and a coil spring 71 engages the forward end of the fork, such spring encircles the rod and engages a shoulder 72 formed in the casing 20. Forward movement of the rod will carry the forks therewith to positively engage the carrier teeth 41 with the holding plate 42 and to engage clutch ring fingers 60 with the teeth on ring 63 whereby positive reverse drive is obtained. A rearward shift of rod 65 will move the carrier 40 therewith to engage planet gears 36 with teeth 43 on shaft 32, but the fork 69 must be moved forwardly to engage clutch 59 with ring 63 and this is accomplished by a lever 73 fixed on shaft 74 rotatably in boss 67. One end of this lever projects into slot 75 in the shift rod and the other end engages the fork 69 so that rearward movement of the rod will pivot the lever to move the clutch ring 59 forwardly into engagement with the ring 63.

As shown in Fig. 20, the rod is in its central axial position where it is retained by spring pressed detent 76. This detent can also engage in other recesses in the rod to retain the rod in the forward or rear positions of its shift. When the rod is in central position the teeth 41 of carrier 38 will be free of teeth 42 but engaged with the teeth of ring gear 39, the planet gears will be disengaged from teeth 43 and clutch ring 59 will be disengaged from ring 63. Shaft 74 extends through a wall of casing 20 and fixed to the projecting end thereof is an arm 74', see Fig. 21, that can be swung manually by mechanism extending within easy reach of the vehicle driver. Rocking of the arm 74' in one direction from central position will establish positive reverse drive by the transmission and movement of the arm in the opposite direction from central position will establish a positive emergency drive through the transmission.

The forward planetary gearing C is controlled by a magnetic clutch 80 and a magnetic holding or brake device 81. In the clutch 80 is a winding 80' and in the device 81 is a winding 81', and arranged between the clutch and the holding device is an armature disk 82 that is riveted to a flexible disk plate 82', the plate being riveted to ring gear 28. The magnet disk clutch 80 is keyed on the sun gear sleeve 21 and the magnet disk 81 is suitably fixed to casing 20. Thus when the magnet clutch 80 is energized armature disk 82 will be moved forwardly and held thereto locking the front planetary gearing to transmit direct drive from the engine driven fluid coupling. When the magnet device 81 is energized, the armature disk 82 will be moved and held stationary therewith, and, as the ring gear 28 is likewise held stationary through flexible plate 82', the planetary gearing will transmit a modified drive, preferably reduced, from the fluid coupling. The flexible plate connection allows the armature to be shifted without overcoming the resistance of the planetary gearing teeth so that there will thus be no delay in the shift.

The rear planetary gearing E is controlled by a magnetic holding or brake device including a magnet 90 fixed in the casing 20 and disk clutch plates 91, some of the plates being slidably splined to the casing 20 and the other plates being slidably splined on the sun gear sleeve 47. In the member 90 is arranged winding 90'. When such electromagnet holding device is energized the clutch plates will be pulled together holding the sun gear 46 stationary and thus modifying the drive through the planetary gearing from shaft 53 to the tail shaft 10 to provide preferably an overdrive. When the electro-magnet device is not energized, the sun gear 46 will be free so that the tail shaft will be driven at the same speed as shaft 53 through the overrunning rollers 57.

A current is supplied to winding 80' by suitable brush 93 and contact 93' and to winding 81' by suitable conductor means 94 having a terminal 94' exterior of the casing 20. Current is supplied to brush 93 by suitable conductor means 95 having a terminal exterior of casing 20. Current is supplied to winding 90' from terminal 89' projecting exteriorly of the casing 20.

Due to the use of the multiple plate clutch in the magnetic holding device and the overrunning clutch for controlling the rear planetary gearing, such mechanism can be arranged entirely beneath the vehicle flooring even though the flooring is close to the ground. The engine 9 is in the space in advance of the dash 96, the fluid coupling and the front clutch 80 and holding device 81 can lie beneath or in advance of the toe board 97, and the portion of the transmission rearwardly thereof is of such small diameter that it can lie entirely under a flat vehicle body floor 98.

The middle planetary gearing D is selectively controlled manually to be locked together, to hold the pinion cage for reverse drive, or to provide direct positive emergency drive between shafts 32 and 53. As previously explained, these conditions can be established upon shifting sleeve 40 through mechanism including rod 65, arm 74', shaft 74 and acutator 73.

This manually operable drive selection mechanism for operating arm 74' is arranged to extend within convenient reach of the vehicle driver and preferably adjacent the vehicle steering wheel 100 at the upper end of a conventional vehicle steering column 101. Parallel with this steering column and suitably fixed thereto is a tube 102 to the upper end of which is fixed housing 103 into which one end of control lever 104 projects and is pivoted so that it can be rocked vertically. As illustrated in Figs. 1 and 2, the lever 104 can be swung forwardly and rearwardly to rotate the tubing 102 therewith, and engages a rod 106 in the tubing to shift the same axially when swung up or down on its pivot. The lever has a pointer 105 fixed thereto in relation to cooperate with an indicator dial 107 mounted on the steering column head so that the driver can visualize the driving relation of the manually shiftable control mechanism.

A plate 108 is suitably fixed to the lower portion of the steering column, below the toe board, and fixed to the upper face thereof by suitable means, such as rivets 109, is a housing 110 having a hub portion 111 serving as a bearing for tube 102. An actuator arm 112 having an integral hub 113 is arranged below the plate 108 and the hub is rotatably mounted on tube 102. The arm is maintained in close relation axially with the plate by a retainer 114 fixed on tubing 102. The arm has a link rod 115 pivotally connected thereto that extends to bell crank 116 pivoted on the engine, and a link 117 connects the bell crank and the arm 74' for the adjustment of shift rod 65 to control the middle planetary gearing.

The arm 112 is swung on its pivot by an actuator 118 fixed to rods 106 by pin 119. This pin also extends through an elongated slot 120 in tube 102 and the actuator is slidably splined on the tube 102. Thus, axial movement of rod 106 will shift the actuator arm 118 therewith and rotative movement of tube 102 will swing the actuator arm therewith. The rod 106 is normally retained in its uppermost position by spring 121 seated in the tube 102. The adjacent faces of the members 112 and 110 are recessed to provide a guide-way for the actuator arm 118 and the adjacent portion of the intermediate plate 108 is open complementary to the recess 126 in member 110 except for abutment 122 which registers with an abutment 122' projecting into recess 125 in arm 112. A spring pressed plunger 123 is slidable in the arm 112 and normally urges the actuator arm 118 toward housing 110 serving as an interlock between the associated parts, and a spring pressed detent 124 is carried by the housing for retaining the actuator centrally in recess 126. The recess 126 in the stationary member 110 allows a limited swinging of the actuator arm therein when swinging the tube 102 to the left or right by forward or rearward movement of the lever 104. The recess 125 of arm 112 overlies recess 126 and the actuator can be shifted from either end of recess 126 into recess 125 when the lever 104 is swung upwardly to push the rod downwardly. After being seated in recesses 125 on one side of abutment 122', rotation of the tube by swinging lever 104 forwardly or rearwardly will rotate the actuator 118 carrying the arm 112 therewith to shift the link mechanism extending to shift rod 65. Rotation of the actuator while seated in recess 125 on either side of abutment 122' will be under plate 108 and will ride past recess 126 so that it will be retained without danger of accidental displacement. The actuator is normally held in the recess 126 by spring 121 urging rod 106 upwardly and placing the lever 104 in its lower position, and the lever 104 must be swung forwardly or rearwardly to move actuator 118 to one or the other end of recess 126 before it can register with one of the recesses 125 and be moved therein to shift the rod 65 by a further forward or rearward movement of lever 104.

This movement of lever 104 and actuator 118 is illustrated specifically in Figs. 1, 2 and 9 wherein N designates neutral position, F designates forward position, 2nd designates second speed drive position, R designates reverse drive position and EM designates emergency drive position. It will be noted that neutral is at the left end of recess 126, 2nd is centrally in recess 126 and forward is at the right end of recess 126. Thus by swinging lever 104 forwardly or rearwardly, when the actuator is in recess 126, the arm 112 will not be moved and shift rod 65 will remain in the central axial position, as shown in Fig. 20, and the middle planetary gearing will be coupled to transmit direct drive from carrier 24 to shaft 53. When the lever is in neutral position, the actuator is in the left end of recess 126 and can be shifted into the left recess 125, by upward movement of the lever, and then will carry the arm 112 therewith when moved to the left by moving the lever forwardly to reverse position. Such shift will move shaft 65 forwardly, engaging carrier teeth 41 with the holding plate 42, providing reverse drive through the middle planetary gearing. When the lever 104 is in the forward position, the actuator will be at the right end of recess 126 and upward movement of the lever will move the actuator into right recess 125 so that rearward movement of the lever to EM position will move the actuator and arm 112 to the right shifting rod 65 rearwardly to engage the planet gears 36 with teeth 43 on shaft 32 and thus couple the shafts 32 and 53 directly together.

Lever 104 is also utilized to operate the main control switch of the electrical system leading to the magnetic clutches. On the lower portion of the steering column is fixed an internally threaded bearing 130 into which the lower end of tube 102 screws and an arm 131 is fixed to this end of the tubing. Arm 131 is coupled to another arm 132 by pin 133. Arm 132 is fixed to shaft 134 mounted on a switch carrier 135, the carrier being secured to the steering column by bolts 136. A Bakelite mounting 137, of semicircular form, and a cover 138 are fixed to the carrier by bolts 139. Contact posts 140 and 141 are arranged in a row on the outer face at one side of the mounting and contact posts 142, 143, 144 and 145 are arranged in a row on the other side of the outer face of the mounting. Intermediate the rows of posts is a contact strip 146 having a terminal post 147 to which is attached conductor means 148 leading to the motor vehicle battery 149. In such conductor means is the engine ignition switch 150 and an indicator light 151.

Fixed on shaft 134 in the switch carrier is an arm 152 having a pin 153 projecting into a slot 154 of a movable contact carrier 155 having walls pivotally mounted on pins 156 fixed to carrier 135. A Bakelite mounting 157 is fixed to the carrier 155 and supports contact members 158 and 159 resiliently seated on coil springs 160. The movable contact member 158 is triangular in shape and is formed with a contact at each corner while the other movable contact 159 is in strip form. Contact rivets 161 secure post 142 to the mounting, contact rivet 162 secures post 143 to the mounting, contact rivet 163 secures post 144 to the mounting and contact rivet 164 secures post 145 to the mounting. The strip contact 146 is secured to the mounting by contact rivets 165, the contact post 140 is secured to the mounting by contact rivet 166 and post 141 is secured to the mounting by contact rivet 167. These contact rivets all extend through the mounting so that they can be engaged by the movable contacts 158 and 159. Contact member 158 has a raised contact portion at each corner, one of the corner contacts engaging rivets of strip 146 and the other two corner contacts being in line with rivets 161, 162, 163 and 164. Contact member 159 has a raised contact portion adjacent each end for engaging contact rivets 166 and 167. The carrier 155 being pivoted on a different axis than the arm 152 will swing substantially twice as far as the arm and, due to this arrangement, room can thus be had to properly space the contacts on the mounting so that there will be no overlapping of engagement when the movable contacts are shifted from one position to another.

A conductor line 168 leads from contact post 141 directly to post 94' of the winding 80' of the magnetic clutch 80 and a conductor line 169 leads from post 140. Conductor lines 170, 171, 172 and 173 lead from posts 142, 143, 144 and 145 respectively and with the lines 168 and 169 are controlled to energize and deenergize the windings 80', 81' and 90'.

The control for the magnetic system, when the main switch is in forward drive position, includes a governor, that can be modified by the throttle control mechanism, by pressure conditions in the engine intake manifold, and an accelerator pedal operated switch mechanism. When the drive is in reverse or direct emergency couple then the magnetic system is controlled by means operated by the shift rail 65.

The governor mechanism is carried at the rear end of casing 20 in a housing formed by walls 175. A hollow drive shaft 176 has gear 177 fixed thereto and such gear meshes with gear 178 formed on the tail shaft 10. Weighted arms 179 are mounted on pivots 180 carried by the shaft 176 and these arms in their centrifugal movement axially shift a control shaft 181 extending through shaft 176. Connected to be operated in conjunction with shaft 181 is a switch control shaft 182 that projects into shaft 176 at one end and is seated in a cylindrical bearing 183 located in a switch base plate 184 in the casing 20. Spring 185 holds the shaft 182 axially against shaft 181. Fixed on the shaft 182 is an actuator hub 186 for controlling a plurality of switch mechanisms 187, 188 and 189 mounted on the plate 184, see Figs. 21, 24, 25 and 26.

Switch 187 is best shown in Figs. 24 and 26. On one face of the switch base plate 184 are arranged three contact posts 192, 193 and 196, and on the other face of the base plate are arranged two terminal posts 194 and 197, all of such posts being insulated from the base plate. A conductor rivet 190 fastens the posts 192 and 194 to the plate, a conductor rivet 198 fastens the posts 196 and 197 to the plate, and a rivet 191 fastens the post 193 to the plate. The contact portion of post 196 is arranged in spaced relation from the contact portions of posts 192 and 193 and a movable switch element is arranged between such contact portions of the posts. This switch element comprises spaced contact plates 195 and 200, the plate 195 being pivotally mounted on arms of a bracket 201. These contact plates are suitably spaced and secured together in such relation and plate 195 is arranged to contact with the contact post 196 while plate 200 is arranged to contact with posts 192 and 193. The movable plate portion of the switch has one end of a coil spring 203 fastened thereto and the other end of such spring is fastened to an anchor member 204 fixed to the governor actuated hub 186, the anchor member 204 being insulated as the hub is formed of insulation material. Axial movement of the hub through means of the over-center spring 203 will flip the movable plate members into the extreme positions of their pivotal movement.

Switch 189 is best shown in Figs. 24 and 27 and it has contact posts 206 and 207 and a terminal post 208. The post 206 has a second contact portion 211 that is spaced from the other contact portion and from the contact portion of post 207. The terminal post 208 and the contact post 206 are insulated from the switch base plate and are secured thereto by means of conductor rivet 210 and contact post 207 is also insulated from the switch base plate and is secured thereto by a rivet 210. A flip of the switch member operates to engage the contact portion 211 of post 206 or to engage the other contact portion of post 206 and the contact portion of post 207. This movable switch structure comprises plates 212 and 220 which are separated by a sheet of insulation 221. The plate 212 is arranged to engage contact buttons 222 and 223 of posts 206 and 207 while the plate 220 has a contact member 224 arranged to engage the contact portion 211 of post 206. The plate 220 is mounted to pivot on a bracket 213 that is insulated from the switch base member 184 and secured thereto by rivets 225. An anchor member 214 is fixed on the insulation hub 186 and has a pair of raised bosses 215 and 216 formed thereon, the boss 216 being raised to a greater extent than the boss 215 and serving as an anchor for one end of a coil spring 217 that is fastened at its other end to switch plate 220. This spring acts as an over-center device that functions when the axial movement of the governor driven hub moves to flip the pivoted switch structure in one direction or the other.

Switch 188 is best shown in Figs. 24 and 29. This switch has terminal posts 226 and 227 and contact posts 228 and 229. These posts are insulated from the switch base plate and a contact rivet 230 fixes posts 226 and 228 to the plate. There is a post 231 similar to post 228 that is fixed to the switch base plate by rivets 232 and this stop post serves to limit movement of the movable switch member comprised of plates 233 and 234. These plates are suitably spaced and secured together, the plate 233 being engageable with the contact post 228 and the plate 234 being engageable with the contact post 229. The plate 234 is pivoted on the arms of a bracket 235 that is insulated from the switch base plate and contact rivets 236 secure this bracket and the terminal post 227 to the switch plate. A coil spring 218 engages switch plate 234 and is anchored at the other end to the boss 215 when the anchor member 214 is fixed to the governor actuated hub 186. Such spring is of the over-center type so that it will move the movable switch structure back and forth as the governor actuated hub shifts its axial position. The bracket 201 and switch 187 are connected with the contact terminal 229 of the switch 188 by means of a tie bar 205. The bracket 235 of switch 188 is connected with the bracket 213 of switch 187 by tie bar 219, and the contact post 207 of switch 189 is connected with the contact post 193 of switch 187 by the tie bar 237.

The arrangement of the spring connections with the anchor members on the governor actuated hub is such that as the speed of the tail shaft increases the governor will move shaft 182 toward the left, as viewed in Fig. 21, and as it moves in such direction it will first trip switch 187 and then later switch 188 and then switch 189. In other words, as the speed increases switch 187 will be tripped first, switch 188 will be tripped second, and switch 189 will be tripped last so that the circuits leading to the magnet windings in the change speed mechanism will be thereby controlled to vary the gear ratio with the speed of the tail shaft. The switches will be shifted back in a reverse manner as the speed of the tail shaft slows down. In order to vary the degree of governor movement required to actuate these three switches, a suitable adjusting arrangement can be made, such for example as an adjustment of shaft 182 relative to hub 186, the shaft being threaded in the hub for this purpose.

In the electrical control system there is arranged a vacuum operated switch, see Figs. 14 to 19 inclusive, the purpose of which is to prevent free-wheeling when the vehicle is decelerating. The engine exhaust manifold is indicated at 238 and the engine intake manifold is indicated at 239. A vacuum responsive diaphragm 240 is arranged in a housing 241 and leading to one side of the diaphragm from the intake manifold is a passage 242. Coil spring 243 is also arranged in the housing 241 and engages the diaphragm to oppose movement of the diaphragm in response to pressure reduction in the intake manifold. Fixed to the housing 241 is a switch housing 244 in which is secured a switch base plate member 250. The diaphragm has one end of an actuator rod 245 fixed thereto and such rod is mounted to slide through the switch base plate. The rod carries an eccentric hub 246 to which one end of an over-center type of coil spring actuator 247 is connected. Terminal posts 251, 252, 253, 254 and 255 are fixed to the face of the switch base plate remote from the diaphragm, and contact posts 256, 257, 258 and 259 are fixed to the face of the switch base plate adjacent the diaphragm. The terminal posts and contact posts are all insulated from the switch base plate 250 and the securing rivets therefore are likewise insulated from the base plate.

Posts 256 and 252 are secured by conductor rivets 266 to the switch base plate 250, the rivets and posts being insulated from the plate. Post 253 and contact 258 are secured to plate 250 by conductor rivets 264, these posts, contacts and rivets being suitably insulated from the plate, while post 255 and contact 259 are similarly secured to the plate by conductor rivets 261. Post 251 and conductor strip 263 are secured to plate 250 by conductor rivets 268, such post, strip and rivet being suitably insulated from the plate. Posts 257 and 255 are insulated from and secured to the plate by conductor rivets 248. Conductor strip 267 is secured in insulated relation on plate 250 by rivets 265. A tie bar 262 is fixed on the plate by rivets 266 and 265, such bar serving as a conductor.

A movable switch structure is shiftable between contacts of the stationary switch structure just described and is carried by a plate 270, formed of insulation material or insulated, that is pivotally mounted on a bracket 276 fixed on plate 250. One end of coil spring 247 is fixed to plate 270 and acts to pivotally actuate the same in accordance with axial movement of rod 245 by pressure. The plate 270 has two pairs of contact strips 271 and 272, the pair of strips 271 being secured to the plate at one end by conductor rivets 273 and the pair of strips 272 being secured to the plate at one end by rivets 274. A flexible conductor 277 connects strip 267 with strip 272 and another flexible conductor 275 connects strip 271 with strip 263. Strips 271 operate between contact members 256 and 258 while strips 272 operate between contact members 259 and 257.

Line 280 is attached to contact post 208 of the governor switch and to contact post 253 of the vacuum switch and line 173 is attached to contact post 252 of the vacuum switch and to contact post 145 of the manual switch. Line 282 is connected to the contact post 254 of the vacuum switch and to contact post 226 of the governor switch. Line 284 connects the terminal post 142 of the manual switch with terminal post 197 of the governor switch. Line 283 connects terminal post 255 of the vacuum switch with terminal post 227 of the governor switch. Line 169 connects with line 282. Line 323 connects terminal post 251 of the vacuum switch with the kick-down switch.

The electrical control system is responsive to the position of the accelerator pedal and in this connection reference may be had to Figs. 1, 4 to 7 inclusive, and 25. There is a switch device comprising two switches 285 and 286, switch 285 being normally open until closed by slight depression of the accelerator pedal and switch 286 being normally closed until opened by the accelerator pedal when depressed beyond wide open position of the engine throttle valve 306. Switch 285 is generally referred to as the accelerator switch and switch 286 is generally referred to as the kick-down switch. Switch 285 must be closed for the electrical governor control to be effective to obtain drive by the transmission and the switch 286 is used to shift back and forth between overdrive and direct drive by the transmission.

Fixed to the under side of toe board 97 is a support bracket 290 to which is fixed a sleeve mounting 291 for the accelerator switch housing 292. The kick-down switch includes a pair of terminal posts 293 and 294 fixed to the lower portion of the housing by contact rivets 295 and contact element 296 is movable inside of the housing to connect and disconnect these contacts. Another pair of terminal posts 297 and 298 for the accelerator switch are fixed to the upper portion of the housing by contact rivets 299, and contact element 300 is movable inside the housing to connect and disconnect these contacts. Contact element 296 is seated on springs 301 in a recess in carrier 302 while contact element 300 is similarly mounted on springs 303 in a recess in carrier 304. An actuator rod 305 extends through sleeve 291, housing 292 and the switch carriers 302 and 304. Spring 301 frictionally holds carrier 302 with the housing until shifted by rod 305. Spring 317 causes carrier 304 to move with rod 305.

An actuator 308 is fixed on the rod in position to engage and move the carrier 302 therewith over a boss 309 in the switch housing and against a stop 310, in the form of a flange struck inwardly from the housing, to disconnect contacts 295 when the throttle pedal is beyond wide open throttle position. As the rod 305 is retracted a washer 311 bearing against clip 312 fixed to the rod will return the switch carrier 302 to contact forming position. A reaction spring 313 encircles rod 305 and bears against disk 314 at its lower end, the disk seating against stop flange 310. In the housing is fixed a wall 315 against which bears disk 316 against which the upper end of spring 313 bears. Spring 317 is seated against the wall and disk 318 which positions switch carrier 304 upwardly against a flanged sleeve 319 fixed to the rod. Downward movement of the rod and sleeve will carry the carrier 304 therewith to break the circuit between contacts 299 when the accelerator pedal is released, but upon a slight pressure against the pedal the carrier is returned to contact forming position by spring 317.

Terminal 293 of the accelerator operated kickdown switch is connected with terminal 143 of the manual switch by lines 320 and 171. Terminal 294 is connected with reverse shift switch 321 by line 322. Line 323 connects terminal post 251 of the vacuum switch with line 320. The reverse switch is connected with magnet winding 90' by line 324. Terminal 297 of the accelerator switch is connected by line 325 with terminal 194 of the governor switch, and line 172 leads from line 325 to terminal 144 of the manual switch. Terminal 298 of the accelerator switch is connected by line 326 with line 284. The winding 81' is connected by line 327 with line 325.

Mechanism is arranged between the accelerator pedal and the switch rod 305 whereby the rod is actuated in a definite relation with the pedal. The bracket 290 is formed with ears 328 on which shaft 329 is rotatably mounted and fixed on an end of this shaft is an arm 330 to which is pivotally connected the accelerator pedal rod 331. Another arm 332 is fixed to the shaft and is connected with the switch rod by link 333, the pivot pin 334 riding in an arcuate slot 335 of the arm. Such slot provides a lost motion connection of a character such that slight pressure against the accelerator pedal will shift the rod 305 to engage switch element 300 with contacts 299, where it will remain until the rear end of the slot reaches the pin. The arm 332 will be swung to further move the rod 305 upwardly only after the throttle valve has been moved to wide open position, at which point the arm picks up the rod and moves it to carry contact 296 out of engagement with contacts 295. In this manner the current to the magnet windings is changed to shift from overdrive to direct. As the pedal is allowed to return from beyond wide open throttle position, the rod will carry switch 296 back into engagement with contacts 295 reestablishing overdrive when actuated by the forward end of slot 335 which gives control to the selection of fourth speed.

The accelerator pedal is normally moved to throttle idling position by spring 336 connected to the vehicle frame and to arm 337. Arm 338 is also fixed on shaft 329 and link 339 extends therefrom to the throttle valve 306. Another arm 340 is pivotally mounted on shaft 329 and engages the throttle arm 338 for manual manipulation when wire 341 is actuated by the driver.

The accelerator pedal actuated mechanism is also utilized to vary the operation of the governor in accordance with throttle opening. Fixed on shaft 329 is arranged an arm 342 to which one end of a link 343 is connected. This link is also connected to an arm 344 fixed on shaft 345 extending through the governor housing 175. Bell crank lever 346 in the housing is fixed to this shaft and one end of the lever is pivotally connected to a bearing element 347 through which rod 348 is slidably mounted. Shaft 181 is provided with a bearing collar 349 engaged by an arm of bell crank 350 that is pivotally mounted on shaft 351 in the housing 175 and the other arm of this bell crank is pivoted at 352 to a yoke 353 in which rod 348 extends. A spring bearing 354 is mounted on rod 348 and a main compression spring 355 is arranged between bearings 354 and 347 to oppose the action of centrifugal force developed by weights 179 to shift shaft 181. Another spring 356 also extends between such bearings 354 and 347.

The connection between the accelerator pedal and the governor shaft is arranged so that depression of the accelerator pedal, opening the throttle valve, increases the load on springs 355 and 356 that must be overcome by centrifugal force before the governor switch shaft will be actuated to cause a ratio change in the gearing. As the spring loading builds up rather high, an assistor is connected with bell crank 346 so that the foot effort required against the accelerator pedal to load the spring is thereby reduced. A link 357 is mounted in the housing 175 on a pin 358 extending through a slot in one end thereof while the other end has a pivotal bearing against a pin 359 on bell crank 346. Spring 360 is seated against a retainer 361 bearing against pin 358 and against an abutment on the other end of link 357 from the pin. After the bell crank has been shifted to a point where pin 359 passes a line between pins 345 and 358, spring 360 will assist the manual effort on the accelerator pedal tending to load springs 355 and 356.

The shift rod 65 for effecting reverse drive has its shifter fork 69 formed with a switch actuator portion 370 against which switch element 371 of the reverse switch 321 rides. This switch element is normally engaged with contacts 372, 373 by spring 374 but such contact is broken by movement of the shift rod into reverse position. Contact 372 has conductor line 324 connected thereto while contact 373 has conductor line 322 connected thereto.

When the ignition switch 150 is closed, the control system is ready to function. The driver, through operation of the hand lever 104, has the choice of establishing reverse drive, neutral, second speed forward drive, forward drive variable automatically, or emergency direct drive. The positions to which the hand lever is moved to obtain the selected drives is indicated in Figs. 1 and 2, while the positions in which the main switch is manually shifted by the hand lever is indicated in Fig. 25.

Current flows from the battery to the contact element 146 when ignition is turned on, but when the lever 104 is in neutral position the main switch is also in neutral, as shown in Fig. 25, so no contact is established to energize any of the magnet windings.

When the hand lever is shifted to reverse position, the movable main switch member 158 will be shifted to the left, as viewed in Fig. 25, and will be ready to energize winding 81' by establishing a connection between contacts 165 on strip 146 and contacts 161. Line 170 is thus energized, but as its connection to winding 81' is by lines 325 and 326 connected by the accelerator switch 285, the accelerator pedal must be depressed slightly to close such switch and connect contacts 299 before the winding 81' is energized. This shifting of the hand lever to reverse position will open the reverse switch 321, so that winding 90' cannot be energized under any condition, and will also manually shift carrier teeth 41 into engagement with the teeth of plate 42 fixed to the gear casing. As winding 81' is energized, armature 82 will be held magnetically to magnet 81 so there will be a geared drive through the front planetary gearing to the sun gear 35 driving planet gears 36 and, due to the carrier 38 being held stationary, the planet gears will drive gear 39 and shaft 53 reversely to drive shaft 17. The carrier 38 has been locked by the movement of the hand lever which through linkage 115, 116, 117 and shifter rod 65 has shifted clutch 68 and this movement of the rod has also shifted yoke 69 to positively engage sleeve 59, splined on tail shaft 10, with ring 63 fixed to hub 56 splined on shaft 53. Thus the reverse drive from shaft 53 will be positive to tail shaft 10. As the accelerator pedal must be slightly depressed to energize the winding 81', the vehicle will not creep in reverse drive relation when standing still.

When the hand lever is shifted to emergency position, usually necessary only when the electrical system fails or when desired to directly couple the drive when being pushed to start the engine, the movable manual switch member operated by lever 104 will not be in contact position to energize the magnet windings. The shift rod 65 will have been moved to rearmost position carrying the planet carrier 38 therewith through fork 68 so that planet gears 36 mesh with teeth 43 on shaft 32, and the rod will also have carried clutch sleeve 59 into positive engagement with ring 63 fixed on carrier 56 by means of the actuator 73 shifting clutch yoke 69 forwardly. Clutch sleeve 59 fixes the tail shaft 10 to rotate with carrier 56 splined on shaft 53 and planetary gears 36 lock the gear 39 and shaft 53 with shaft 32 which is positively connected to sun gear sleeve 21 by ring 44. With the rod 65 in central or reverse position the planetary gear 36 will be disengaged from shaft 32 thus disconnecting the positive direct drive between the shafts 32 and 53.

When the vehicle is travelling over hills, it is sometimes desirable to manually set the drive in second speed forward, and this drive can be established by shifting the hand lever to the position indicated as 2nd in Figs. 1 and 2. As can be seen in Fig. 25, the switch member 158 operated by lever 104 will be moved so that contact is made thereby from strip contact 165 to contact 162 of terminal 143 and also from contact 165 to contact 163 of terminal 144. The reverse switch and the kick-down switch will be closed so current will flow through lines 171, 320, 322 and 324 to the winding 90' thus holding plates 91 and sun gear 46 stationary with the casing 20. Current will also flow through lines 172, 325 and 327 to winding 81' to hold the armature 82 with the magnet 81 so that the drive will be through the front planetary gearing to carrier 56 of the rear planetary gearing, and as the rear sun gear is held stationary the drive will be through the rear planetary gearing to the tail shaft 10. As these conductor line connections to windings 81' and 90' are direct, the governor and vacuum switches cannot have any influence.

When forward drive, variable with speed and engine operating conditions, is desired the hand lever is moved to the position indicated at F in Figs. 1 and 2. The middle planetary gearing will be engaged for direct drive therethrough as shown in Fig. 3. As can be seen in Fig. 25, the movable switch element 158 will be positioned manually to engage contact 165 on strip 146 with contact 164 of terminal 145 and the movable switch element 159 will connect contacts 166 and 167 of terminal posts 140 and 141. This is the only position of switch element 159 that will establish current in lines 169 and 168. When the manual switch is in such position four forward driving speeds in the transmission are possible, the selection being under control of the governor switch, the vacuum switch and the accelerator operated switches.

Assuming now that the manual control switch is in forward position with contacts 166 and 167 connected and with contacts 165 and 164 connected, lines 169 and 168 leading to magnet winding 80' will be connected and line 173 will be energized. When the pressure in the engine intake manifold is high, the vacuum switch mechanism will be in the position shown in Figs. 14, 17 and 18, thus current flows to lines 262, 283 and 219 to the governor switch which below a predetermined shaft speed is in the positions shown in Fig. 25 so that current flows through lines 205, 284 and 326 to the accelerator switch and as soon as the accelerator pedal is slightly depressed connecting contacts 299 current flows through lines 325 and 327 to the winding coil 81' thereby locking armature 82 to magnet clutch 81 so that the forward planetary drives through the gearing to shaft 53 and through the overrunning clutch rollers 57 to the tail shaft 10. Whenever the ignition is turned on and the hand lever is shifted to forward position, the drive mechanism will be in first speed as soon as the accelerator pedal is slightly depressed, thus when the vehicle is standing still the circuit establishing first gear is open and the vehicle will not creep.

The governor is set to shift switch 187, as shown in dotted lines in Fig. 25, when the tail shaft reaches a predetermined speed, thus disconnecting line 284 but connecting lines 283, 219 and 205 with line 325. Line 325 is connected with winding 81' by line 327. At the same time current flows from switch 187, through lines 237, 211, 280, vacuum switch 271, lines 323 and 320, through the kick-down switch, line 322, reverse switch 321 and line 324 to winding 90'. Thus the front planetary drives through the gears and sun gear 46 is held stationary, so the drive through the rear planetary to the tail shaft is stepped up and second speed forward is had until the governor shifts its controlled switch back to first speed or shifts switch 188 to the dotted position shown in Fig. 25 establishing third speed forward.

When switch 188 is moved to establish third speed forward, the electrical connection to winding 81' and 90' is broken and connection is made between lines 283, 219 and line 282. Line 169 is connected with line 282 and as the manual switch is set connecting lines 169 and 168, the magnet winding 80' is energized. Thus the armature 82 is shifted and held stationary by magnet 80 locking planet gears 27 in their rotation giving a direct drive to shaft 53 from which the overrunning roller clutch 57 transmits the drive to the tail shaft 10.

When the tail shaft driving in third speed forward reaches a predetermined speed, the governor switch 189 moves into the position shown in dotted lines in Fig. 25 establishing fourth speed forward, which in the present showing is an overdrive. The connection of lines 283, 219, 282, 169 and 168 is maintained as in third speed forward so that the magnet winding 80' remains energized. Line 219 is also connected with line 280 which is connected with line 323 through the vacuum switch, so that current flows through line 320, the kick-down switch, line 322, the reverse switch and line 324 to magnet winding 90'. Thus the ring gear 28 is locked to sun gear 23 by armature 82 which in turn is held by magnet 80, and sun gear 46 is held by plates 91 that in turn are held by magnet 90. The drive will be through the rotating planet gears 27 to shaft 53 and through the rotating planet gears 49 to tail shaft 10.

With the construction herein described, the transmission will require a relatively small space requirement, and will respond to the driver's desire simply through his actuation of the accelerator pedal after being adjusted for forward drive. Such control provides an automatic selection of gear ratios which will give maximum acceleration for all car speeds at full throttle position of the accelerator pedal, and likewise provides automatic adjustment to the lowest numerical transmission gear ratio that will be suitable for road load conditions when the vehicle is running at substantially uniform speed. All intermediate requirements between road load requirements and full throttle requirements also are provided through sole operation of the accelerator pedal. The accelerator pedal is interconnected with the governor switch to obtain such results.

The arrangement of gears and speed ratio selecting mechanism is such that the transmission can be fitted into a motor vehicle without tunneling the floor of the body, even in view of the present tendency to lower the floor. The overrunning clutch and a multiple disk held rear planetary provide a relatively small diameter unit behind the toe board, the diameter of the fluid coupling and front magnetic clutches being of small importance as they can be located in advance of the toe board where space is more plentiful. The present design permits the use of helical gears because there is no high inertia forces created due to acceleration of parts having considerable mass in the rear end of the unit. The use of a reduction ratio in the front planetary unit and an overdrive ratio in the rear planetary reduces the clutch holding requirement of the rear planetary to a minimum. By using the overrunning clutch, the drag of an equivalent magnetic clutch is eliminated and the timing consideration, required when shifting if two magnets were used, for the rear planetary unit is eliminated.

The rear planetary gearing including the overrunning clutch and magnetic clutch sun gear holding means would not be acceptable in motor vehicles if manually controlled, because freewheeling would occur when the drive passes through the overrunning clutch in first and third forward gear ratios, but the automatic control takes care of this due to the vacuum switch.

As already stated, true automatic operation or control must include the willful selection by the driver to obtain maximum acceleration at all times when the accelerator pedal is fully depressed and second for all road load conditions under which the transmission will operate at top speed, the accelerator pedal is interconnected and becomes a part of the control mechanism. The entire automatic operation is based on road load and engine requirement conditions. It is well known that if the torque curves are plotted for the gear ratios in any transmission device, and that if these torque curves are plotted against the car speed at maximum torque for all engine speeds, the torque curve in first speed will cross the maximum torque curves for second speed at a definite car speed for a given engine. Therefore maximum torque for the propeller shaft or maximum driving torque for the car is obtained in the first gear ratio only below the speed of intersections between the torque gears for first speed and second speed. Beyond this car speed maximum acceleration or maximum driving torque for the rear wheels is obtained in second gear and this condition will persist until the car speed is reached at which the curve for maximum torque second gear crosses the curve for maximum torque in third gear. Beyond this speed maximum driving torque is obtained in third gear and the cycle repeats itself until the curve for maximum torque in the third gear crosses the curve for maximum torque in the third or fourth gear. For given partly open throttle positions these torque curves will shift downward and speeds of intersection will also shift slightly.

In order to provide a control mechanism which is so arranged as to automatically provide shifting from one geared speed to another at or slightly before the speeds of an intersection for full throttle opening, I provide automatically for the gear ratio which will deliver the maximum torque possible at any particular car speed to the propeller shaft. This operation is obtained by the governor arranged to operate the switches of the magnetic clutch and holding devices to cause their corresponding actuation and engage or disengage as the case requires. If this governor had a fixed pattern of operation all shifts would be made at the same speeds irrespective of the throttle opening, and in such case the gear ratio would be fixed to car speed. In order to vary the speeds at which the shifts take place, the governor is interconnected with the accelerator in such a way that the governor will actuate its switches to cause the shift to take place at the intersecting speeds for full throttle position only. The connection between the accelerator and the governor provides for a diminution of the resistance against which the governor must operate for part throttle openings so that the governor will actuate the switches at lower car speeds, thus reducing the shifting speeds to lower values. The governor is designed so that it will operate to its full range at a comparatively low speed and by increasing the resistance necessary for the governor to move against by the interconnecting spring and lever mechanism leading from the accelerator pedal in such a way that depressing by increment movements downward of the accelerator increases resistance to governor movement so that at full depression of the accelerator the resistance offered to movement of the governor will correspond to the speeds for shifting at the intersecting points of the torque curves. With this arrangement, if the car is coasting and the throttle is in its idling position, the transmission will remain engaged at the top gear relation until the car is coasted down to the lowest speed at which the governor can retain its position for fourth gear operation. If this should be, say, fifteen to twenty miles an hour, the transmission will then shift into third gear, and as the car slows down further it will shift successfully in second gear and then in the first gear.

Such operation however would provide freewheeling in coasting when the car shifts into third gear and again when it shifts into first gear. The vacuum switch obviates this freewheeling condition in third gear and first gear and so long as the throttle is in idling position, the vacuum is high, and the governor control is temporarily eliminated so that the vacuum operated switch holds the transmission in fourth gear engagement. The vacuum spring is arranged so that the control switch reinstates the governor control when the car speed reduces to approximately five miles an hour. Thus with this control arrangement free-wheeling will be eliminated except at speeds below five miles an hour which is regarded as unobjectionable.

It is also apparent that maximum driving torque is available at the rear wheels and consequently maximum acceleration at all times and for all road conditions when the accelerator is fully depressed. It is also a feature of this control mechanism that for part throttle operations the transmission will operate in top gear for all road load conditions at which a substantially uniform speed can be maintained with the throttle partly open. While such an arrangement provides for correct and technically logical operation of the motor vehicle, it of course does not provide for certain arbitrary methods of operation to which present automobiles are adapted. It will however provide for the most economical operation of the car and for unerring shifting under maximum requirements.

When a transmission is coupled with a fluid flywheel there is a certain amount of drag under idling conditions, and it will be necessary, unless some other means is provided, to hold the car from creeping at traffic lights and other places by applying the brakes slightly. In order to eliminate such creeping the control mechanism is arranged so that the magnetic clutch and holding devices are disengaged when the car comes to a stop. The accelerator pedal operated switch is connected to the accelerator pedal so that it closes a circuit to the first speed forward clutch when the accelerator pedal is slightly depressed by the driver's foot. When the driver's foot is removed from the accelerator pedal, the switch will disconnect the circuit but only when the car is in first gear standing still. So long as the accelerator pedal is depressed, the governor will function to make the speed selection and, in effect, this switch provides a complete neutral so far as magnetic devices are concerned.

The kick-down switch is operated by the accelerator to open the circuit when the accelerator is moved beyond wide open throttle position and under such circumstances the switch serves to change the circuit arrangement whereby the overdrive circuit is disconnected and a third speed circuit is established. Likewise when the kick-down switch is again returned to shift, the drive will be shifted from direct back to overdrive.

The mechanism has another feature for maneuvering the car under certain conditions and particularly useful in negotiating hills and more particularly from going down hill to provide a gear speed in which the transmission can be made to operate regardless of car speed. When the manual control is moved to position indicated at 2nd, mechanical drive will be in second gear only. In such a shift the governor control circuits are disconnected so that it is possible to coast down hill using the engine as a brake or to maneuver the car in parking or in other ways without bringing in automatic operation and it is of course understood that the type of control could be arranged so that the transmission could be so operated in either first or second gear.

In cases where all of the electrical circuits are damaged or where no current supply is available for the operation of the magnetic clutch and holding devices, the mechanical shift means provides a drive or permits the car to be pushed thereby cranking the engine in case the battery is run down. This mechanical connection is provided by mechanism under the control of the manual shift lever 104 which moves the reverse or middle planet carrier into fixed driving relation with the shaft 32 connecting it directly with shaft 53 and the driven member 12 of the hydraulic coupling, the clutch 59 being at the same time engaged with carrier 51 splined on shaft 53. Such connections provide a direct mechanical connection from the fluid coupling to the tail shaft and permit driving the car in emergencies.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. Transmission mechanism comprising a drive shaft, a tail shaft, a drive planetary gearing driven by the drive shaft, a driven planetary gearing coupled with the tail shaft, coupling means connecting the planetary gearings, said coupling means being selectively operable to establish a direct drive or a reverse drive, means operable to establish either one of two driving speeds through the drive planetary gearing, means shiftable to establish or break the drive through the driven planetary gearing, and an overrunning one-way clutch means for connecting the coupling means with the tail shaft when the driven planetary gearing is out of driving relation.

2. In transmission mechanism, a drive shaft, a tail shaft, three connected, aligned planetary gearings between and coupled to said shafts, means operable to establish either one of two driving speeds through the planetary gearing adjacent the drive shaft, means operable to hold or release the planet gear carrier of the middle planetary gearing, control means operable to hold or release the sun gear of the planetary gearing adjacent the tail shaft, and an overrunning clutch for connecting the middle planetary gearing directly with the tail shaft when the sun gear of the rear planetary gearing is released.

3. In transmission mechanism, a drive shaft, a tail shaft, three aligned, connected planetary gearings drivingly connecting said shafts, the middle planetary gearing having an axially shiftable carrier for the planet gear mountings, a fixed member, means on said carrier engageable with said fixed member to hold said carrier stationary, means operable to shift said carrier, means operable to establish either one of two driving speeds in the forward driving planetary gearing, means for holding or releasing the sun gear of the rear planetary gearing, and an overrunning one-way clutch operable to connect the middle planetary gearing in direct driving relation with the tail shaft.

4. In transmission mechanism, a drive shaft, planetary gearing driven by said drive shaft, means operable to establish either one of two driving speeds from said planetary gearing, a second planetary gearing connected to rotate with said first mentioned gearing, and means operable to lock said second planetary gearing and establish a positive driving couple therefrom directly to said drive shaft independently of said first mentioned planetary gearing.

5. In transmission mechanism, a drive shaft, a pair of connected, aligned planetary gearings, the forward gearing having a drive connection with said drive shaft, a coupling shaft extending axially through said planetary gearing, means connecting the forward end of said coupling shaft to rotate positively with said drive shaft, and means operable to drivingly connect said coupling shaft with the planet gears of the rear planetary gearing.

6. In transmission mechanism, a drive shaft, a pair of aligned planetary gearings, the forward gearing having its sun gear fixed to rotate with said drive shaft and its planet gear carrier coupled to the sun gear of the rear planetary gearing, and clutch means operable to drivingly connect the planet gears of the rear gearing positively with the sun gear of the forward gearing.

7. In transmission mechanism, a drive shaft, a pair of aligned planetary gearings, the forward gearing having its sun gear fixed to rotate with said drive shaft and its planet gear carrier fixed to the sun gear of the rear planetary gearing, a shaft extending through said gearings, means fixing the forward end of the shaft to the sun gear of the forward gearing, teeth on the rear end of the shaft, and means operable to shift the planet gears of the rear gearing into or out of mesh with the teeth on said shaft.

8. In transmission mechanism, a drive shaft, a pair of aligned connected planetary gearings, the sun gear of the forward gearing being fixed to the drive shaft, control means operable to establish either one of two driving speeds through the forward planetary gearing, coupling means fixed to the sun gear of the forward planetary gearing and having teeth at the rear of the planet gears of the rear planetary gearing, a fixed member, and means operable to shift the planet gear carrier of the rear planetary gearing forwardly into locked relation with said fixed member to provide a reverse drive or rearwardly to mesh the planet gears with the teeth on said coupling means to provide a direct positive drive when said control means is ineffective, the shifting of said carrier being insufficient to disengage the planet gears from normal engagement with the sun and ring gears.

9. In transmission mechanism, a drive shaft, a tail shaft, three aligned planetary gearings coupled for transmitting power between said shafts, control means operable to establish either one of two driving speeds from the forward planetary gearing, control means operable to hold or release the planet gear carrier of the middle planetary gear, means operable to hold or release the sun gear of the rear planetary gearing, an overrunning clutch operable to drive the tail shaft at the speed of the middle planetary gearing, a positive clutch operable to lock the rear planetary with the tail shaft, and an interconnection between the control means for the middle planetary gearing and the positive clutch whereby the rear planetary will be locked when the carrier of the middle planetary gearing is held.

10. In transmission mechanism, a drive shaft, a tail shaft, three aligned connected planetary gearings for transmitting power between said shafts, control means operable to establish either one of two driving speeds from the forward planetary gearing, control means operable to hold or release the planet gear carrier of the middle planetary gearing, brake means operable to hold or release the sun gear of the rear planetary gearing, an overrunning clutch operable to directly couple the planet gear carrier of the rear planetary gearing with the tail shaft when the brake means for the rear planetary gearing is released, a clutch shiftable to positively couple the planet gear carrier of the rear planetary gearing with the tail shaft, and means interconnecting said positive clutch means and said control means whereby they will be shifted together to positively engage the rear planetary gearing carrier with the tail shaft when the carrier of the middle planetary gearing is held.

11. In transmission mechanism, a drive shaft, a tail shaft, three aligned connected planetary gearings for transmitting power between the drive shaft to the tail shaft, the forward planetary having a control for selecting either one of two driving speeds therethrough and a sun gear fixed to the drive shaft, the sun gear of the middle planetary gearing being fixed to the planet carrier of the forward planetary gearing, and the ring gear of the middle planetary gearing having a fixed connection with the planet gear carrier of the rear planetary gearing, a coupling member fixed to the forward planetary gearing sun gear, a stationary member, a control member shiftable to move the carrier of the middle planetary gearing forwardly to lock with said stationary member and rearwardly to engage the planet gears with the coupling member, a disk clutch operable to hold or release the sun gear of the rear planetary gearing, an overrunning clutch operable to directly connect the planet gear carrier of the rear planetary gearing with the tail shaft, a positive clutch shiftable to connect the tail shaft with the planet carrier of the rear planetary gearing, and an interconnection between the positive clutch and the control member of the middle planet carrier whereby the positive clutch will be engaged when either the middle carrier is held or the middle planet gears are engaged with the coupling member.

12. Transmission mechanism comprising a power driven fluid coupling, a drive shaft driven by the fluid coupling, a front planetary gearing having a sun gear fixed to said shaft and a ring gear and a planet gear carrier, a tail shaft, a rear planetary gearing having a ring gear in driving relation with said tail shaft, a planet gear carrier and a sun gear, coupling means drivingly connecting the planet gear carriers of said planetary gearings, magnetically controlled means operable to establish either one of two driving speeds through the front planetary gearing, magnetically controlled means operable to hold or release the sun gear of the rear planetary gearing, an overrunning clutch operable to drivingly connect the planet gear carrier of the rear gearing with the tail shaft when the associated sun gear is released by the magnetically controlled means, a clutch mounted to rotate with the tail shaft and shiftable to engage the planet gear carrier of the rear gearing.

13. In transmission mechanism, a tail shaft, a power operated driving planetary gearing, magnetic means for controlling said gearing to selectively establish direct or modified drive, a speed modifying driven planetary gearing coupled to the tail shaft, coupling means for drivingly connecting the planetary gearings, magnetic means operable to establish positive drive through the driven planetary gearing, an overrunning clutch automatically operable to drive the tail shaft directly from the coupling means when the driven planetary gearing is idling, electrical means for selectively energizing said magnetic means including a main conductor switch, shiftable means for mechanically controlling the coupling means, and manually operable means for controlling said shiftable means and said main conductor switch and in definite relationship.

14. In transmission mechanism, a tail shaft, a power operated driving planetary gearing, magnetic means controlling said gearing to selectively establish either one of two driving speeds therethrough, a speed modifying driven planetary gearing coupled with the tail shaft, coupling means for drivingly connecting the planetary gearings, magnetic means operable to establish positive drive through the driven planetary gearing, an overrunning clutch operable automatically to drive the tail shaft from the coupling means when the driven planetary gearing is idling, a positive two-way clutch operable to drive the tail shaft with the coupling means, electrical means for controlling said magnetic means for both planetary gearings, shiftable means for mechanically controlling the coupling means and the two-way clutch, and manually operable means for controlling said shiftable means and said electrical means in definite relationship.

15. In transmission mechanism, a tail shaft, a power operated driving planetary gearing, magnetic means for controlling said gearing to selectively establish direct or modified drive, a speed modifying driven planetary gearing coupled to the tail shaft, coupling means for drivingly connecting the planetary gearings, magnetic means operable to establish positive drive through the driven planetary gearing, an overrunning clutch automatically operable to drive the tail shaft directly from the coupling means when the driven planetary gearing is idling, a positive two-way clutch operable to drive the tail shaft with the coupling means, electrical means for selectively energizing said magnetic means including a main conductor switch, shiftable means for mechanically controlling the coupling means and the two-way clutch, and manually operable means for controlling said shiftable means and said main conductor switch and in definite relationship.

16. In transmission mechanism, a tail shaft, a power operated driving planetary gearing, magnetic means for controlling said gearing to selectively establish direct or modified drive, a speed modifying driven planetary gearing coupled to the tail shaft, coupling means for drivingly connecting the planetary gearings, magnetic means operable to establish positive drive through the driven planetary gearing, an overrunning clutch automatically operable to drive the tail shaft directly from the coupling means when the driven planetary gearing is idling, a positive two-way clutch operable to drive the tail shaft with the coupling means, electrical means for selectively energizing said magnetic means including a main conductor switch and automatic means for selecting the operation of the magnet means, shiftable means for mechanically controlling the coupling means and the two-way clutch, and manually operable means for controlling said shiftable means and said main conductor switch and in definite relationship.

17. In transmission mechanism, a tail shaft, a power operated driving planetary gearing, magnetic means for controlling said gearing to selectively establish direct or modified drive, a speed modifying driven planetary gearing coupled to the tail shaft, coupling means for drivingly connecting the planetary gearings, magnetic means operable to establish positive drive through the driven planetary gearing, an overrunning clutch automatically operable to drive the tail shaft directly from the coupling means when the driven planetary gearing is idling, electrical means for selectively energizing said magnetic means including a main conductor switch and automatic means for selecting the operation of the magnet means, shiftable means for mechanically controlling the coupling means, and manually operable means for controlling said shiftable means and said main conductor switch and in definite relationship.

18. In transmission mechanism, a tail shaft, a power operated driving planetary gearing, magnetic means controlling said gearing to selectively establish either one of two driving speeds therethrough, a speed modifying driven planetary gearing coupled with the tail shaft, coupling means for drivingly connecting the planetary gearings, magnetic means operable to establish positive drive through the driven planetary gearing, an overrunning clutch operable automatically to drive the tail shaft from the coupling means when the driven planetary gearing is idling, a main electrical conductor switch, shiftable means controlling the coupling means, manually operable means for controlling the shiftable means and said switch, a governor driven from the tail shaft, and electrical circuit means connecting the magnet means with the main switch including a selector switch device, said governor controlling said selector switch.

19. In transmission mechanism, a power driven shaft, a tail shaft, a driving planetary gearing driven by the power shaft, magnetic means controlling said gearing to establish either one of two driving speeds therethrough, a speed modifying driven planetary gearing coupled with the tail shaft, coupling means shiftable to directly connect the planetary gearings or to connect the power shaft and the driven planetary gearing, magnetic means operable to establish drive through the driven planetary gearing, an overrunning clutch adapted to drivingly connect the coupling means with the tail shaft, a positive clutch for drivingly connecting the coupling means and the tail shaft, shiftable means for positioning said coupling means in either driving relation and for controlling the positive clutch, an electrical system including a main conductor switch for selectively energizing said magnetic means, and manually operable means for actuating said shiftable means and said main switch, the main switch being opened and the positive clutch being engaged when the coupling means connects the driven planetary with the drive shaft.

20. In transmission mechanism, a tail shaft, power operated driving planetary gearing, magnetic means controlling said gearing to selectively establish either a direct or a modified drive therethrough, a speed modifying planetary gearing coupled with the tail shaft, coupling means drivingly connecting said planetary gearings, magnetic means operable to establish positive drive through said driven planetary gearing, an overrunning clutch operable automatically to drive the tail shaft from the coupling means when the driven planetary gearing is idling, electrical means for controlling said magnetic means to establish a plurality of tail shaft driving speeds, said electrical means including a main conductor switch and automatic circuit selector switch means, and means manually operable to shift the main switch into closed position where the selector switch controls the magnet means or into a direct conductor relation with the magnet means to establish one driving ratio in the planetary gearing to the exclusion of all others.

21. In transmission mechanism, a tail shaft, a power operated driving planetary gearing, magnetic means controlling said gearing to selectively establish either one of two driving speeds therethrough, a speed modifying driven planetary gearing coupled with the tail shaft, coupling means shiftable to connect said planetary gearings in either forward or reverse drive, magnetic means operable to establish positive drive through said driven planetary gearing, an overrunning clutch operable automatically to drive the tail shaft from the coupling means when the driven planetary gearing is idling, electrical circuit means for controlling said magnetic means for both planetary gearings including a main conductor switch, a positive clutch for directly driving the tail shaft from the coupling means, means operable to shift said coupling means into forward or reverse drive relation and to shift said positive clutch into driving relation when reverse drive is established and out of driving relation when forward drive is established, means actuated by said coupling shift means to break the electrical connection to the driven planetary gearing when shifted to reverse drive position, and a manually operable means for controlling said main switch and said coupling shift means.

22. In a motor vehicle, a power plant, an accelerator pedal operable to control the power plant, a tail shaft, a driving planetary gearing driven by the power plant, a driven planetary gearing coupled with the tail shaft, coupling means drivingly engaging said planetary gearings, an overrunning clutch coupling said coupling means with the tail shaft when the driven planetary gearing is idling, magnetic means for controlling the driving planetary gearing to establish direct or modified drive therethrough and for engaging the driven planetary in various relations to establish a plurality of tail shaft driving speeds, speed operated means connected to automatically control the magnetic means and selectively establish a plurality of driving ratios, and means responsive to actuation of the accelerator pedal for controlling the magnetic means to modify the action of the speed operated control means when one of the speed operated drive relations has been established.

23. In a motor vehicle, a power plant having a fuel intake manifold and a fuel control valve, an accelerator pedal operable to control the power plant, a tail shaft, a driving planetary gearing driven by the power plant, a driven planetary gearing coupled with the tail shaft, coupling means drivingly engaging said drive and driven planetary gearing, an overrunning clutch automatically operable to drive the tail shaft from the coupling means when the driven planetary gearing is idling, magnetic means operable to establish direct or modified drive through the driving planetary gearing and to establish drive through the driven planetary gearing in various relations for a plurality of tail shaft driving speeds, and means responsive to actuation of the accelerator pedal and to pressure conditions in the intake manifold to control the magnetic means.

24. In a motor vehicle, a power plant, an accelerator pedal controlling the power plant, a tail shaft, a driving planetary gearing driven by the power plant, a driven planetary gearing coupled with the tail shaft, coupling means directly connecting the planetary gearings, an overrunning clutch for driving the tail shaft from the coupling means when the driven planetary gearing is idling, magnetic means for holding a portion of the driven planetary gearing to establish positive drive therethrough, magnetic means for locking the driving planetary gearing or for holding a portion thereof to modify its drive, electrical circuit means automatically shiftable to control the magnetic means to establish different driving speeds for the tail shaft, a main conductor switch for the circuit means, and a normally open accelerator pedal controlled switch in the electrical circuit means, preventing current flow while the vehicle is standing still, said last mentioned switch being closed upon slight pressure against the pedal.

25. In a motor vehicle, a power plant having a throttle valve, an accelerator pedal controlling the power plant throttle valve, a tail shaft, a driving planetary gearing driven by the power plant, a driven planetary gearing coupled with the tail shaft, coupling means drivingly connecting the two planetary gearings, an overrunning clutch for automatically connecting the coupling means with the tail shaft when the driven planetary gearing is idling, magnetic means operable to establish either one of two driving speeds through the driving planetary gearing and to establish positive drive through the driven planetary gearing, electrical circuit means controlling said magnetic means to automatically establish different driving speeds of the tail shaft, and accelerator pedal actuated means in the circuit means operable to cause shifting back and forth between two of the driving circuits at the will of the vehicle operator, said last mentioned means responding only to pedal movement beyond wide open throttle position.

26. In a motor vehicle, a power plant having a throttle valve, an accelerator pedal controlling the power plant throttle valve, a tail shaft, a pair of connected planetary gearings, one of said gearings being driven by the power plant and the other of the gearings being coupled with the tail shaft, magnetic means operable to establish two driving speeds from the power plant driven planetary gearing and to establish drive to the tail shaft through the connected planetary gearing, an overrunning clutch for automatically connecting the tail shaft with the power plant driven planetary when the tail shaft connected planetary gearing is idling, electrical circuit means operable to energize the magnet means selectively to establish a plurality of tail shaft speeds, governor means driven by the tail shaft and operable to automatically control the circuit means, and a connection between the accelerator pedal and the governor means for modifying the effective circuit control by the governor when the pedal is moved beyond wide open throttle position.

27. In a motor vehicle, a power plant having a throttle valve, an accelerator pedal operable to control the power plant throttle valve, a tail shaft, a driving planetary gearing driven by the power plant, a driven planetary gearing coupled with the tail shaft and driven by the driving planetary gearing, an overrunning clutch means adapted to transmit drive from the driving planetary gearing to the tail shaft when the driven planetary gearing is idling, magnetic means for controlling the driving planetary gearing to establish direct or modified drive therethrough and for establishing drive through the driven planetary gearing, and means responsive to the accelerator pedal for modifying the effect of the magnetic means when the pedal is pressed beyond wide open throttle position.

28. In a motor vehicle, a power plant having a fuel intake manifold and a fuel control valve, an accelerator pedal operable to control the power plant, a tail shaft, a driving planetary gearing driven by the power plant, a driven planetary gearing coupled with the tail shaft and connected in driven relation with the driving planetary gearing, an overrunning clutch automatically operable to drive the tail shaft from the driving planetary gearing when the driven planetary gearing is idling, magnetic means operable to establish direct or modified drive through the driving planetary gearing and to establish drive through the driven planetary gearing in various relations for different tail shaft speeds, and means responsive to actuation of the accelerator pedal and to pressure conditions in the intake manifold for controlling the magnetic means.

29. In a motor vehicle, a power plant having a throttle valve, an accelerator pedal controlling the power plant throttle valve, a tail shaft, a driving planetary gearing driven by the power plant, a driven planetary gearing coupled with the tail shaft and in driven relation with the driving planetary gear, an overrunning clutch for automatically coupling the tail shaft with the driving planetary gearing when the driven planetary gearing is idling, magnetic means operable to establish either one of two driving speeds through the driving planetary gearing and to establish positive drive through the driven planetary gearing, electrical circuit means controlling said magnetic means to automatically establish three different forward driving speeds of the tail shaft, and means operative to modify the circuit means when establishing one of the forward speeds and thereby establish a different forward driving speed, said circuit modifying means being controlled in response to operation of the accelerator pedal.

30. In a motor vehicle, a power plant, an accelerator pedal controlling the power plant, a tail shaft, a driving planetary gearing driven by the power plant, a driven planetary gearing coupled with the tail shaft and a positive connection with the driving planetary gearing, an overrunning clutch for driving the tail shaft from the driving planetary gearing when the driven planetary gearing is idling, magnetic means for holding a portion of the driven planetary gearing to establish positive drive therethrough, magnetic means for locking the driving planetary gearing or for holding a portion thereof to modify the drive therefrom, electrical circuit means automatically shiftable to control the magnetic means and thereby establish different driving speeds for the tail shaft, a main conductor switch for the circuit means and a normally open accelerator pedal control switch in the electrical circuit means for preventing current flow to the magnet means while the vehicle is standing still, said last mentioned switch being closed upon slight pressure against the pedal.

31. In a motor vehicle, a power plant, an accelerator pedal controlling the power plant, a tail shaft, a driving planetary gearing driven by the power plant, a driven planetary gearing coupled with the tail shaft, coupling means for positively connecting said planetary gearing, magnetic means operable to establish two driving speeds from the power plant driven planetary gearing and to establish drive through the planetary gearing idly connected with the tail shaft, an overrunning clutch for automatically connecting the tail shaft coupling means when the tail shaft connected planetary gearing is idling, a main conductor switch, a manually operable means for shifting said coupling means and said main switch, electrical circuit means leading from said main switch for selectively energizing the magnet means to establish a plurality of tail shaft speeds, governor means driven by the tail shaft operable to control the electrical circuit means and select the tail shaft driving speed, and a connection between the accelerator pedal and the governor means for regulating the operation of the governor means in accordance with pedal position.

32. In transmission mechanism, the tail shaft, the power operated driving planetary gearing magnetic means controlling said gearing to selectively establish either one of two driving speeds therethrough, the speed modifying driven planetary gearing idly coupled with the tail shaft, coupling means shiftable to connect said planetary gearings in either forward or reverse drive, magnetic means operable to establish positive drive to said driven planetary gearing, an overrunning clutch operable automatically to drive the tail shaft from the coupling means when the driven planetary gear is idling, electrical circuit means for controlling said magnetic means for both planetary gearings including a main conductor switch, a positive clutch for directly driving the tail shaft from the coupling means, means operable to shift said coupling means to establish forward or reverse drive relation and to shift said positive clutch into driving relation when reverse drive is established and out of driving relation when forward drive is established, means actuated by said coupling shift means to break the electrical connection to the magnet means for the driven planetary gearing when shifted to reverse drive position, said main switch being shiftable to establish an electrical connection between the magnet means for one of the drives through the driving planetary when the coupling means is shifted into reverse drive, and a manually operable means for controlling said main switch and said coupling shift means.

33. In a transmission mechanism, a tail shaft, power driven change speed gearing for driving said tail shaft, magnetic means controlling said gearing to establish direct or modified drives therethrough, electrical means for controlling said magnetic means, said electrical means including a main conductor switch and automatic circuit selector switch means, and means manually operable to shift the main switch into closed position where the selector switch controls the magnetic means or into a direct conductor relation with the magnetic means to establish one driving ratio in the change speed gearing to the exclusion of all other driving ratios.

34. In a transmission mechanism, a power driven shaft, a tail shaft, change speed gearing connecting said shaft, magnetic means controlling said change speed gearing, an electrical system including a main conductor switch for selectively energizing said magnetic means, means for establishing a positive direct drive between said shafts, and manually operable means for actuating said direct drive establishing means and said main switch, the main switch being open when the positive direct drive is established.

35. In a motor vehicle, a power plant having a fuel intake manifold, a driving planetary gearing driven by the power plant, a tail shaft, a driven planetary gearing coupled with the tail shaft, said planetary gearings being drivingly connected, an overrunning clutch adapted to drivingly connect the driving planetary gearing with the tail shaft when the driven planetary gearing is idling, magnetic means operable to control the drive through said planetary gearings, governor means responsive to tail shaft means for selecting the operation of the magnetic means to control the driving speed of the tail shaft, and means responsive to low pressure conditions in the intake manifold controlling said magnetic means to prevent idling of the driven planetary gearing.

36. In a motor vehicle, a power plant having a fuel intake manifold, change speed gearing driven by the power plant including an overrunning clutch, a tail shaft adapted to be driven by said overrunning clutch or by a positive driving connection with the change speed gearing, magnetic means for automatically controlling the driving speed of the change speed gearing and the selection of the drive to the tail shaft including a governor driven by the tail shaft, and means responsive to and effective during predetermined low pressure conditions in the intake manifold for nullifying the governor action to establish direct drive from the change speed gearing to the tail shaft.

37. In a motor vehicle, a power plant, an accelerator pedal controlling the fuel supply to the power plant, change speed gearing driven by the power plant and in driving relation with the tail shaft, magnetic means controlling said change speed gearing, and means for automatically controlling said magnetic means including switch means operable by said pedal, said switch means including a normally open switch in the automatic means adapted to be closed by the pedal when slightly depressed and a normally closed switch adapted to be opened when the accelerator pedal is depressed beyond full fuel supply position, said normally closed switch when opened reducing the driving speed through the change speed gearing.

38. In a motor vehicle, a driving planetary gearing, a driven planetary gearing, manually shiftable coupling means operable to establish a direct drive connection or a reverse drive connection between said planetary gearings, a tail shaft with which the driven planetary gearing is coupled, an overrunning clutch operable to drive the tail shaft from the coupling means when said driven planetary gearing is idling, a positive clutch operable in conjunction with the manually operable coupling means to establish positive drive from the coupling means to the tail shaft during reverse drive, magnetic means controlling said planetary gearings to establish a plurality of driving speeds, automatic means controlling the forward driving speeds of the gearing, and switch means operable in conjunction with coupling means operation to break the circuit to the driven planetary gearing when the drive is in reverse.

39. In a motor vehicle, a power plant having a fuel intake manifold, an accelerator pedal controlling fuel supplied to the manifold, a driving planetary gearing, a driving connection from the power plant to the gearing including a fluid coupling, magnetic means operable to establish either one of two driving speeds through said drive gearing, a driven planetary gearing, a tail shaft with which the driven planetary gearing is idly connected, shiftable coupling means for connecting said gearings in forward or reverse driving relations, manually operable means for shifting said coupling means, an overrunning clutch for driving the tail shaft from the coupling means, a positive clutch shiftable by said manually operable means to connect the coupling means and the tail shaft during reverse drive, magnetic means operable to establish the drive through the driven planetary gearing, electrical circuit means for controlling said magnetic means, automatic means for controlling the circuit means to select the driving speed of the tail shaft, means responsive to pressure conditions in the intake manifold cooperating with the circuit means to prevent drive through the overrunning clutch when the power plant is decelerating, and switch means responsive to slight depression of the accelerator pedal controlling the circuit means to make or break the current flow or to divert the current flow to establish a lower driving speed through the gearing.

40. In a motor vehicle, an engine, an accelerator pedal controlling the fuel supply for the engine, change speed gearing driven by the engine, a tail shaft operable by the gearing, automatic means for selecting the drive through the gearing including magnetic control means, a governor device driven from the tail shaft controlling said automatic means, a connection between the pedal and the governor device for varying the effectiveness of the governor in accordance with the fuel supply, and means for assisting the manual operation of the accelerator pedal beyond a predetermined depression.

41. In a motor vehicle, an engine, an accelerator pedal controlling the fuel supply for the engine, change speed gearing driven by the engine, a tail shaft driven by the change speed gearing, electrical means automatically operable to vary the driving speed of the gearing, a dual switch having one switch device for establishing the electrical means after a slight depression of the pedal, and another switch for changing the electrical means adjustment to reduce the driving speed of the gearing after the pedal is depressed beyond maximum fuel supply position, and actuating means between the pedal and the switch means, said actuating means having a lost motion connection in its movement between the pedal travel between said switches.

WALTER R. GRISWOLD.